(12) United States Patent
Fujita et al.

(10) Patent No.: US 10,345,742 B2
(45) Date of Patent: Jul. 9, 2019

(54) SHEET MANUFACTURING APPARATUS, POWDER STORAGE CONTAINER FOR SHEET MANUFACTURING APPARATUS, AND POWDER SUPPLY DEVICE

(71) Applicant: SEIKO EPSON CORPORATION, Tokyo (JP)

(72) Inventors: Shigeo Fujita, Nagano (JP); Masayuki Kobayashi, Nagano (JP); Kaneo Yoda, Nagano (JP); Toshiaki Yamagami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/768,276

(22) PCT Filed: Oct. 13, 2016

(86) PCT No.: PCT/JP2016/004573
§ 371 (c)(1),
(2) Date: Apr. 13, 2018

(87) PCT Pub. No.: WO2017/064867
PCT Pub. Date: Apr. 20, 2017

(65) Prior Publication Data
US 2018/0299805 A1    Oct. 18, 2018

(30) Foreign Application Priority Data

Oct. 15, 2015 (JP) .................................. 2015-203478
Nov. 27, 2015 (JP) .................................. 2015-231418

(51) Int. Cl.
*D04H 1/60* (2006.01)
*G03G 15/08* (2006.01)
(Continued)

(52) U.S. Cl.
CPC ......... *G03G 15/0898* (2013.01); *B65G 65/40* (2013.01); *B65G 65/463* (2013.01);
(Continued)

(58) Field of Classification Search
USPC ...................................................... 162/230
See application file for complete search history.

(56) References Cited

U.S. PATENT DOCUMENTS

| | | |
|---|---|---|
| 4,834,246 A | 5/1989 | Inoue et al. |
| 2007/0154237 A1 | 7/2007 | Okamoto et al. |
| 2008/0260422 A1 | 10/2008 | Sasae et al. |

FOREIGN PATENT DOCUMENTS

| | | |
|---|---|---|
| JP | 59-077151 U1 | 5/1984 |
| JP | 63-243978 A | 10/1988 |

(Continued)

OTHER PUBLICATIONS

The Extended European Search Report for the corresponding European Patent Application No. 16855121.6 dated Apr. 11, 2019.

*Primary Examiner* — Mark Halpern

(57) ABSTRACT

In a sheet manufacturing apparatus which includes an installation unit on which a container that stores a powder is installed and which manufactures sheets including the powder and fibers, the installation unit includes an inlet for receiving the powder from the container, and a first shutter for opening and closing the inlet, the first shutter is capable of moving between an open position at which the inlet is opened and a closed position at which the inlet is closed in accordance with attachment and detachment of the container with respect to the installation unit, and the first shutter is provided with a plurality of shutter members and, at the open position, the plurality of shutter members are stored overlapping one another.

9 Claims, 28 Drawing Sheets

(51) Int. Cl.
  *B65G 65/40* (2006.01)
  *B65G 65/46* (2006.01)
  *D04H 1/732* (2012.01)

(52) U.S. Cl.
  CPC ........... *D04H 1/60* (2013.01); *G03G 15/0875* (2013.01); *G03G 15/0886* (2013.01); *D04H 1/732* (2013.01); *G03G 2215/0177* (2013.01)

(56) References Cited

FOREIGN PATENT DOCUMENTS

| | | |
|---|---|---|
| JP | 2006-139069 A | 6/2006 |
| WO | 2006/052005 A2 | 5/2006 |

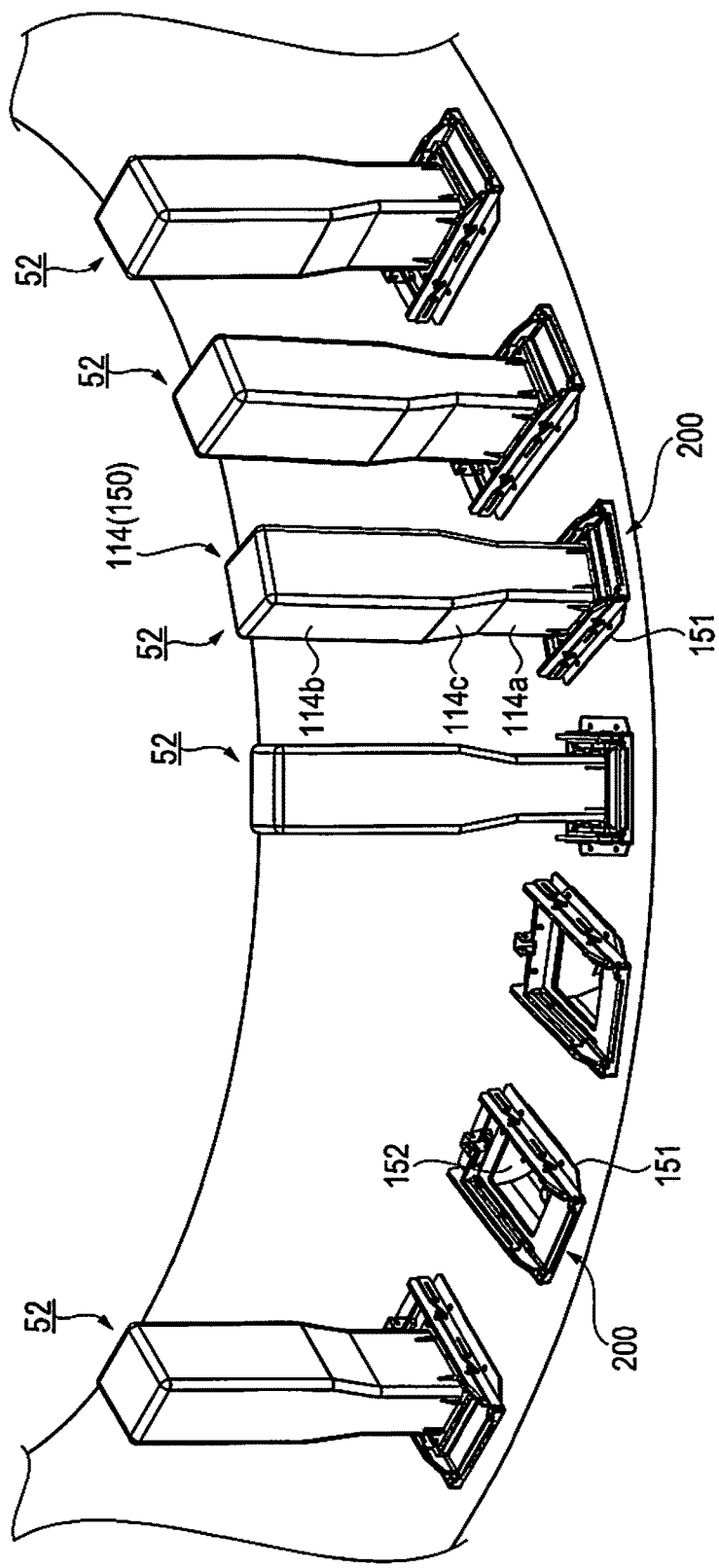

SHEET MANUFACTURING APPARATUS, POWDER STORAGE CONTAINER FOR SHEET MANUFACTURING APPARATUS, AND POWDER SUPPLY DEVICE

CROSS-REFERENCE TO RELATED APPLICATIONS

This application is a U.S. National stage application of International Patent Application No. PCT/JP2016/004573, filed on Oct. 13, 2016, which claims priority under 35 U.S.C. § 119(a) to Japanese Patent Application No. 2015-203478, filed in Japan on Oct. 15, 2015 and Japanese Patent Application No. 2015-231418, filed in Japan on Nov. 27, 2015. The entire disclosures of Japanese Patent Application Nos. 2015-203478 and 2015-231418 are hereby incorporated herein by reference.

TECHNICAL FIELD

The present invention relates to a sheet manufacturing apparatus, a powder storage container for the sheet manufacturing apparatus, and a powder supply device.

BACKGROUND ART

In the related art, there is disclosed an opening and closing mechanism which is provided with a cartridge container in which a toner (a powder) is stored and a toner box to which the toner is supplied from the cartridge container, and which includes a container-side cover member (a container-side shutter) which opens and closes in accordance with a film and a cover member which seal an opening portion of the cartridge container, and a box-side cover member (a box-side shutter) which opens and closes a toner receiving port of the toner box (for example, refer to Japanese Unexamined Patent Application Publication No. 63-243978).

A developer container including a container main body having an opening portion which allows a stored developer to flow out and a sliding cover capable of sliding such that the opening portion opens and closes freely is known (for example, refer to Japanese Unexamined Patent Application Publication No. 59-77151).

However, in the configuration of the above-described Japanese Unexamined Patent Application Publication No. 63-243978, in a case in which the box-side cover member (the box-side shutter) which opens and closes the toner receiving port of the toner box is at the open position, a large space to store the box-side cover member becomes necessary and this is unsuitable for reducing the size of the apparatus.

When the container-side shutter (the container-side cover member) of the cartridge container is always in a state of being capable of opening and closing, for example, in a case in which the cartridge container is installed on the toner box or the like, there is a concern that problems will arise such as the powder scattering due to the container-side shutter opening unintentionally.

In the configuration of the above-described Japanese Unexamined Patent Application Publication No. 59-77151, when, after the container is installed on a hopper of a recording apparatus, the sliding cover is caused to slide to cause the developer to flow out from the opening portion toward the hopper, for example, in a case in which the sliding cover is removed from the container main body, there is a problem in that a space of the same thickness as the sliding cover is formed between the hopper and the container main body and the developer scatters from the space.

SUMMARY

The present invention was created in order to solve at least a part of the above-described problems and may be realized as the below forms or application examples.

APPLICATION EXAMPLE 1

A sheet manufacturing apparatus according to the application example is a sheet manufacturing apparatus which manufactures sheets including a powder and fibers, including an installation unit on which a container that stores a powder is installed, in which the installation unit includes an inlet for receiving the powder from the container, and a first shutter for opening and closing the inlet, in which the first shutter is capable of moving between an open position at which the inlet is opened and a closed position at which the inlet is closed in accordance with attachment and detachment of the container with respect to the installation unit, and in which the first shutter is provided with a plurality of shutter members and, at the open position, the plurality of shutter members are stored overlapping one another.

According to the sheet manufacturing apparatus according to the application example, the sheet manufacturing apparatus includes the first shutter which is capable of moving between an open position at which the inlet is opened and a closed position at which the inlet is closed in accordance with the attachment and the detachment of the container with respect to the installation unit. Since the first shutter includes the plurality of shutter members and the plurality of shutter members are stored overlapping one another at the open position, it is possible to reduce the space for storage to a small space and it is possible to obtain a reduction in the size of the sheet manufacturing apparatus.

APPLICATION EXAMPLE 2

In the sheet manufacturing apparatus according to the application example, it is preferable that the container and the installation unit be capable of relative movement along a first direction, and that a shutter movement mechanism for moving the first shutter to open and close the inlet when the container moves along the first direction with respect to the installation unit be provided.

According to the application example, it is possible to perform opening and closing of the first shutter in accordance with the installation of the container (the movement of the container) using the shutter movement mechanism.

APPLICATION EXAMPLE 3

In the sheet manufacturing apparatus according to the application example, it is preferable that the shutter movement mechanism include a first engaging portion which is provided on the first shutter, and that, the first engaging portion and a second engaging portion which is provided on the container engage and the first shutter move along the first direction and open and close the inlet in accordance with movement of the container along the first direction.

According to the application example, it is possible to perform opening and closing of the first shutter in accordance with the installation of the container (the movement of the container) using the engagement of the first engaging portion which is provided on the first shutter and the second engaging portion which is provided on the container.

APPLICATION EXAMPLE 4

In the sheet manufacturing apparatus according to the application example, it is preferable that the installation unit include a mounting portion on which the container is mounted and which includes a support portion which supports the container such that the container is capable of moving along the first direction between an installation start position and an intermediate position, and a slider unit which includes a cam groove for moving the mounting portion in a second direction which intersects the first direction to move the container between the intermediate position and an installation completion position.

According to the application example, it is possible to perform the installation of the container by mounting the container on the mounting portion in a state in which the container is moved in the second direction which intersects the first direction and moving the container. Accordingly, it is possible to perform the installation of the container by moving the container at a position distanced from the installation unit and subsequently moving the container downward, and it is possible to reliably mount the container to the installation unit and perform the installation. It is possible to improve the sealing properties (the adherence properties) between the container and the installation unit.

APPLICATION EXAMPLE 5

In the sheet manufacturing apparatus according to the application example, it is preferable that the slider unit include a lever portion for manipulating the slider unit, that when the container is at the installation start position, the lever portion be positioned below the container, and that when the container is at the intermediate position, the lever portion be provided to be positioned closer to a front side in an installation direction than the container.

According to the application example, since the lever portion is under the container when the container is at the intermediate position, in other words, at least when the container is at the installation start position, it becomes difficult to manipulate the lever portion. Accordingly, it is possible to prevent the erroneous manipulation of the lever portion.

The expression "under the container" in the present specification refers to a position on the inlet side with respect to the container, and the expression "the front side in the installation direction" refers to the front side with respect to a direction lined up in the order of the installation start position and the intermediate position, that is, the side positioned in the opposite direction from the direction lined up in the order of the installation start position and the intermediate position (the installation start position side).

APPLICATION EXAMPLE 6

In the sheet manufacturing apparatus according to the application example, it is preferable that the lever portion include a lever support portion which supports the container which is present at the installation start position.

According to the application example, since it is possible to support the container at the installation start position using the lever support portion which is provided on the lever portion, it is possible to prevent the falling over of the container when mounting the container on the mounting portion. In a state in which the container is supported (mounted) on the lever support portion, since it is not possible to move the mounting portion in the second direction, it is possible to suppress erroneous manipulation.

APPLICATION EXAMPLE 7

In the sheet manufacturing apparatus according to the application example, it is preferable that the mounting portion include an abutting portion which abuts on a convex portion which is provided on one side of the container along the installation direction and prevents movement of the container before the container reaches the intermediate position from the installation start position.

According to the application example, it is possible to suppress installation of the container in reverse orientation, that is, to suppress erroneous installation using a convex portion which is provided on the front side in the installation direction of the container.

APPLICATION EXAMPLE 8

In the sheet manufacturing apparatus according to the application example, it is preferable that the container include an opening for supplying the powder which is stored, a second shutter for opening and closing the opening, and a locking mechanism for locking the second shutter at the closed position at which the second shutter covers the opening, and that the installation unit include an unlocking mechanism for unlocking the second shutter when the container is installed and is at the installation completion position.

According to the application example, since it is not possible to open the second shutter until the installation of the container is completed due to the locking mechanism, it is possible to prevent the scattering of the powder caused by erroneous manipulation or the like.

APPLICATION EXAMPLE 9

In the sheet manufacturing apparatus according to the application example, it is preferable that the locking mechanism include an elastic portion for engaging with the second shutter to lock the second shutter at the closed position, and that the unlocking mechanism deform the elastic portion to unlock the second shutter when the container moves from the intermediate position to the installation completion position.

According to the application example, since the elastic portion is deformed to unlock the second shutter when the container moves from the intermediate position to the installation completion position, it is possible to perform the unlocking at approximately the same time as the completion of the installation of the container. Therefore, it is possible to perform the opening of the second shutter without delay after the container is installed.

APPLICATION EXAMPLE 10

A powder storage container for a sheet manufacturing apparatus according to the application example is a powder storage container for a sheet manufacturing apparatus which is installed on a sheet manufacturing apparatus and which stores a powder, and the powder storage container includes an opening for supplying the powder which is stored to the sheet manufacturing apparatus, a shutter for opening and closing the opening, and a locking mechanism for locking the shutter at the closed position at which the shutter covers the opening, in which the locking mechanism includes an elastic portion provided with an engaging portion which engages with the shutter, and in which the engagement between the engaging portion and the shutter is released by the elastic portion deforming and the shutter is unlocked.

According to the powder storage container for the sheet manufacturing apparatus according to the application example, the elastic portion deforms due to the installation of the container and the engagement between the engaging portion and the shutter is released in a state in which the shutter is locked at the closed position at which the opening is covered by the locking mechanism, and thus, it is possible to prevent the shutter from being unintentionally opened before the installation or during the installation of the powder storage container, and it is possible to prevent the scattering of the powder caused by erroneous manipulation.

APPLICATION EXAMPLE 11

A powder supply device according to the application example is provided with a storage chamber, a powder storage container, and a stopping portion. The storage chamber is a storage chamber in which the powder is stored and which includes an inlet for pouring the powder and an outlet portion for supplying the powder. The powder storage container is a powder storage container which stores the powder and includes an opening for transferring the powder from the inlet to the storage chamber and an opening and closing unit for opening and closing the opening. When the opening is opened and the storage chamber is communicated with the powder storage container, the powder which is stored in the powder storage container is poured into the storage chamber due to gravity. The stopping portion is for stopping the atmosphere communicating path which is formed when the opening is opened and the storage chamber is communicated with the powder storage container and which communicates the storage chamber, the powder storage container, or both with the outside.

According to this configuration, the atmosphere communicating path between the storage chamber and the powder storage container which is formed when the powder is pouted from the powder storage container toward the storage chamber is stopped by the stopping portion. Accordingly, it is possible to prevent the powder from scattering from the atmosphere communicating path.

APPLICATION EXAMPLE 12

In the powder supply device according to the application example 11, the opening and closing unit of the powder storage container includes a first shutter for opening and closing the opening which is provided on the powder storage container such that the first shutter is attachable and detachable and an attachment and detachment port for attaching and detaching the first shutter, in which the attachment and detachment port is opened to form at least a portion of the atmosphere communicating path when the first shutter is removed, and in which the stopping portion includes a second shutter which covers the atmosphere communicating path between the attachment and detachment port and the opening when the first shutter is removed.

According to this configuration, the atmosphere communicating path which is formed when the first shutter is removed is covered by the second shutter when the first shutter is removed. Accordingly, it is possible to reliably prevent the scattering of the powder.

APPLICATION EXAMPLE 13

In the powder storage container of the powder supply device according to the application example 12 includes a guide portion which guides the movement for attachment and detachment of the first shutter, the stopping portion includes a biasing member which biases the second shutter, and the second shutter is positioned at a first position at which the second shutter abuts on the first shutter which moves along the guide portion due to being biased by the biasing member, and when the first shutter moves in a direction in which the first shutter is removed and separates from the second shutter, the second shutter is positioned at a second position at which the second shutter covers the atmosphere communicating path.

According to this configuration, by always biasing the second shutter to the first shutter side, it is possible to swiftly cover the atmosphere communicating path in accordance with the removal of the first shutter.

APPLICATION EXAMPLE 14

In the second shutter of the powder supply device according to the application example 13, the abutting portion between the second shutter and at least the first shutter is formed of an elastic member.

According to this configuration, since the second shutter abuts on the first shutter without any gaps, it is possible to prevent the scattering of the powder.

APPLICATION EXAMPLE 15

The powder storage container of the powder supply device according to any one of the application example 11 to the application example 14 includes a first collar portion which is provided on a circumference of the opening, the storage chamber includes a second collar portion which is provided on a circumference of the inlet, the first collar portion abuts on the second collar portion when the powder storage container is installed on the storage chamber, and the stopping portion is provided on the first collar portion, the second collar portion, or both.

According to this configuration, it is possible to easily install the stopping portion.

APPLICATION EXAMPLE 16

The sheet manufacturing apparatus according to any one of the application example 11 to the application example 15 includes a mixing unit which mixes, in the atmosphere, a binding resin powder and fibers which are supplied by the powder supply device, and a sheet forming unit which accumulates and heats the mixture which is mixed by the mixing unit to form a sheet.

According to this configuration, it is possible to prevent problems such as dirt on the apparatus and dirt on the sheet caused by the scattering of the binding resin powder.

APPLICATION EXAMPLE 17

The powder storage container according to the application example is a powder storage container which stores a powder and includes an opening for supplying the powder, a first shutter for opening and closing the opening, an attachment and detachment port for attaching and detaching the first shutter, and a second shutter which covers the attachment and detachment port when the first shutter is removed.

According to this configuration, when the first shutter is removed, the attachment and detachment port is covered by the second shutter. Accordingly, it is possible to prevent the powder from scattering from the attachment and detachment port.

APPLICATION EXAMPLE 18

A powder storage container according to the application example is a powder storage container which stores a powder and includes an opening for supplying the powder, a first shutter for opening and closing the opening, an attachment and detachment port for attaching and detaching the first shutter, and a second shutter which cuts off a path portion between the opening and the attachment and detachment port, the path portion being a path in which the first shutter which is present at a closed position at which the opening is closed moves when being removed from the attachment and detachment port.

According to this configuration, since the path between the opening and the attachment and detachment port is cut off by the second shutter when the first shutter is removed, it is possible to prevent the scattering of the powder from the attachment and detachment port.

BRIEF DESCRIPTION OF DRAWINGS

FIG. 2 is a perspective view illustrating the schematic external appearance of a powder supply unit in the sheet manufacturing apparatus.

DESCRIPTION OF EMBODIMENTS

Figure 1:
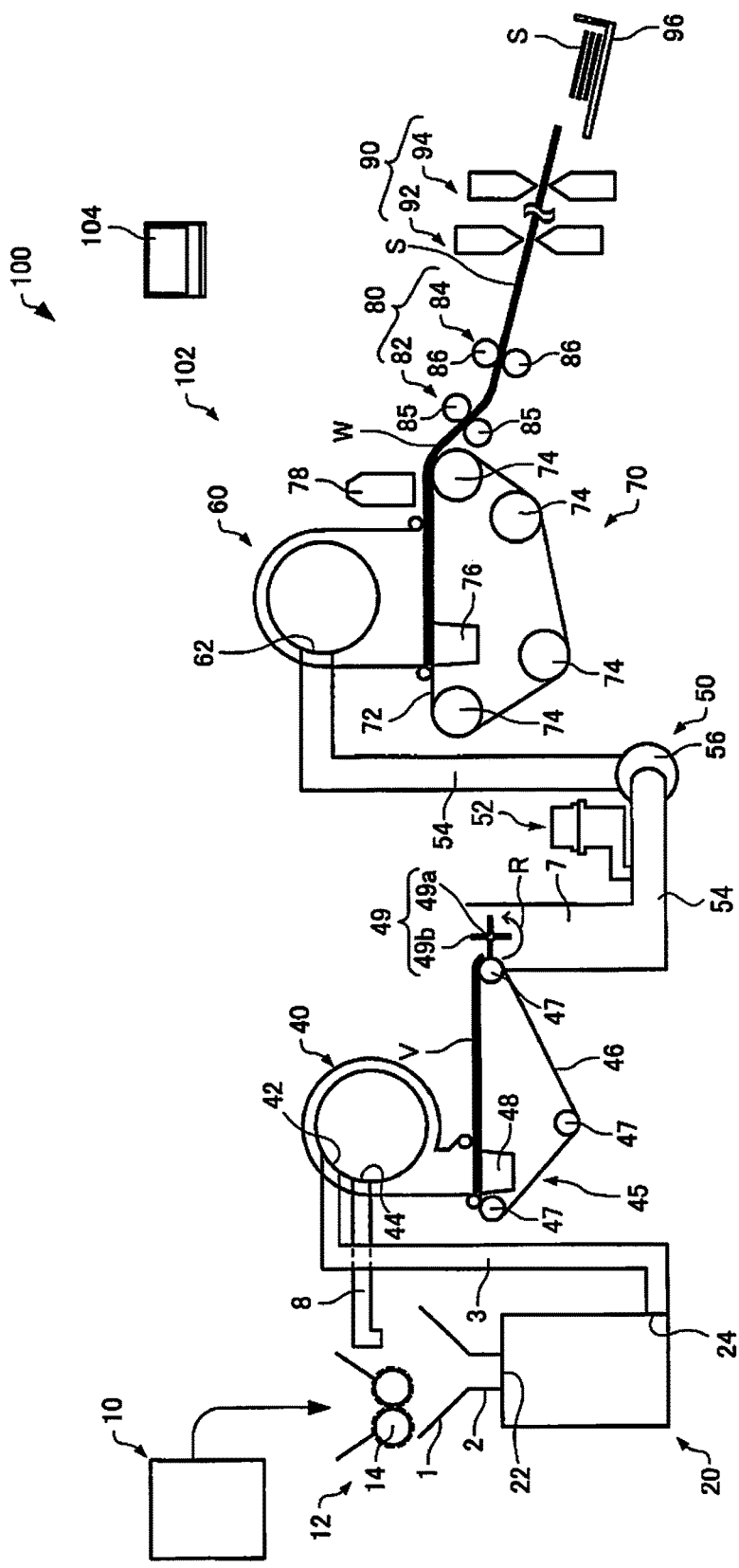
FIG. 1 is a schematic configuration view illustrating the configuration of a sheet manufacturing apparatus.

Hereinafter, the embodiments of the present invention will be described with reference to the drawings. In the drawings used in the following description, the scale of each member is depicted differently from actuality to render each member a visually recognizable size. The configuration which is described hereinafter depicts an example of the present invention and does not limit the number (the number) and the disposition of each constituent part. The description may be given referring to a gravity direction as "under" or "a bottom side", the opposite direction from the gravity direction as "above" or "a top side", and "an up-down direction" to include the gravity direction and the counter-gravity direction.

(First Embodiment)

A description will be given of the first embodiment of the present invention.

First, a description will be given of the schematic configuration of the sheet manufacturing apparatus. A sheet manufacturing apparatus is an apparatus which is provided with a mixing unit which mixes, in a gas, a powder and fibers including a binding resin which are supplied by a powder supply unit, and a sheet forming unit which allows a mixture which is mixed by the mixing unit to accumulate and performs heating to form a sheet. Hereinafter, a description will be given of the configuration of the sheet manufacturing apparatus with reference to FIGS. 1 and 2. FIG. 1 is a schematic configuration view illustrating the configuration of the sheet manufacturing apparatus. FIG. 2 is a perspective view illustrating the schematic external appearance of the powder supply unit in the sheet manufacturing apparatus.

As illustrated in FIG. 1, a sheet manufacturing apparatus 100 is provided with a supply unit 10, a manufacturing unit 102, and a control unit 104. The manufacturing unit 102 manufactures sheets. The manufacturing unit 102 includes a crushing unit 12, a defibrating unit 20, a sorting unit 40, a first web forming unit 45, a rotating body 49, a mixing unit 50, an accumulating unit 60, a second web forming unit 70, a sheet forming unit 80, and a cutting unit 90.

The supply unit 10 supplies a feedstock to the crushing unit 12. The supply unit 10 is, for example, an automatic insertion unit for continuously inserting the feedstock into the crushing unit 12. The feedstock which is supplied by the supply unit 10 is, for example, a feedstock which includes fibers such as old paper and pulp sheets.

The crushing unit 12 cuts the feedstock which is supplied by the supply unit 10 in the air to obtain shreds. The shape and size of the shreds is, for example, a square shred of several centimeters. In the example in the drawings, the crushing unit 12 includes a crushing blade 14 and is capable of cutting the inserted feedstock using the crushing blade 14. For example, a shredder is used as the crushing unit 12. The feedstock which is cut by the crushing unit 12 is received by a hopper 1 and is subsequently transferred (transported) to the defibrating unit 20 via a tube 2.

The defibrating unit 20 defibrates the feedstock which is cut by the crushing unit 12. Here, the term "defibrate" refers to untangling the feedstock (defibration target matter) in which a plurality of fibers is bonded. The defibrating unit 20 also includes a function of separating matter such as resin grains, ink, toner, and a bleeding inhibitor which is adhered to the feedstock from the fibers.

The matter which passes through the defibrating unit 20 is referred to as "defibrated matter". In addition to the defibrated matter which is defibrated, the "defibrated matter" may include resin (resin for binding a plurality of fibers together) grains which separate from the fibers when untangling the fibers, colorants such as ink and toner, and additives such as a bleeding inhibitor and paper strengthener.

The defibrating unit 20 performs the defibration using a dry system. In this manner, performing a process such as defibration in the atmosphere (in the air) instead of in a liquid will be referred to as a dry system. In the present embodiment, an impeller is used as the defibrating unit 20. The defibrating unit 20 includes a function of aspirating the feedstock and generating an airflow to discharge the defibrated matter. Accordingly, the defibrating unit 20 is capable of aspirating the feedstock together with an airflow from an inlet 22, performing a defibration process, and transporting the defibrated matter to a discharge port 24 by using an airflow generated by the defibrating unit 20 itself. The defibrated matter which passes through the defibrating unit 20 is transferred to the sorting unit 40 via a tube 3. The airflow for transporting the defibrated matter from the defibrating unit 20 to the sorting unit 40 may use an airflow which is generated by the defibrating unit 20, or an airflow generating device such as a blower may be provided and the airflow thereof may be used.

The defibrated matter which is defibrated by the defibrating unit 20 enters the sorting unit 40 from an inlet 42 and the sorting unit 40 sorts the defibrated matter according to the length of the fibers. As the sorting unit 40, for example, a sieve (a sieve) is used. The sorting unit 40 includes a mesh (a filter, a screen) and is capable of separating fibers or particles that are smaller than the size of the aperture of the mesh (a first sorted matter which passes through the mesh) and fibers, non-defibrated fragments, or lumps that are larger than the size of the aperture of the mesh (a second sorted matter which does not pass through the mesh). For example, the first sorted matter is transferred to the mixing unit 50 via a tube 7. The second sorted matter is returned to the defibrating unit 20 from the discharge port 44 via a tube 8. Specifically, the sorting unit 40 is a cylindrical sieve which is rotationally driven by a motor. As the mesh of the sorting unit 40, for example, expanded metal in which a metal plate with cuts therein is stretched out or punched metal in which holes are formed in a metal plate using a press machine or the like.

The first web forming unit 45 transports the first sorted matter which passes through the sorting unit 40 to the mixing unit 50. The first web forming unit 45 includes a mesh belt 46, a stretch roller 47, and an aspiration unit (a suction mechanism) 48.

The aspiration unit 48 is capable of aspirating the first sorted matter, which passes through the openings (the openings in the mesh) of the sorting unit 40 and which is scattered in the air, on the mesh belt 46. The first sorted matter accumulates on the mesh belt 46 which moves and forms a web V. The basic configuration of the mesh belt 46, the stretch roller 47, and the aspiration unit 48 is the same as a mesh belt 72, a stretch roller 74, and a suction mechanism 76 of the second web forming unit 70 which is described later.

The web V is formed in a state including much air and softly expanded through passing through the sorting unit 40 and the first web forming unit 45. The web V which is accumulated on the mesh belt 46 is inserted into the tube 7 and transported to the mixing unit 50.

The rotating body 49 is capable of cutting the web V before the web V is transported to the mixing unit 50. In the example of the drawings, the rotating body 49 includes a base portion 49a and protruding portions 49b which protrude from the base portion 49a. The protruding portions 49b have a plate shape, for example. In the example of the drawings, four of the protruding portions 49b are provided, and the four protruding portions 49b are provided at an equal interval. The protruding portions 49b are capable of rotating using the base portion 49a as a shaft due to the base portion 49a rotating in a direction R. Due to the web V being cut by the rotating body 49, for example, it is possible to reduce fluctuations in the amount of the defibrated matter per unit time which is supplied to the accumulating unit 60.

The mixing unit 50 mixes the first sorted matter which passes through the sorting unit 40 (the first sorted matter which is transported by the first web forming unit 45) and a powder including a binding resin. The mixing unit 50 includes a powder supply unit (a powder supply device) 52 which supplies the powder, a tube 54 which transports the first sorted matter and the powder, and a blower 56. The tube 54 continues from the tube 7.

In the mixing unit 50, an airflow is generated by the blower 56 and, while mixing the first sorted matter and the powder, it is possible to transport the mixture in the tube 54. The mechanism which mixes the first sorted matter and the powder is not particularly limited.

Figure 3A:
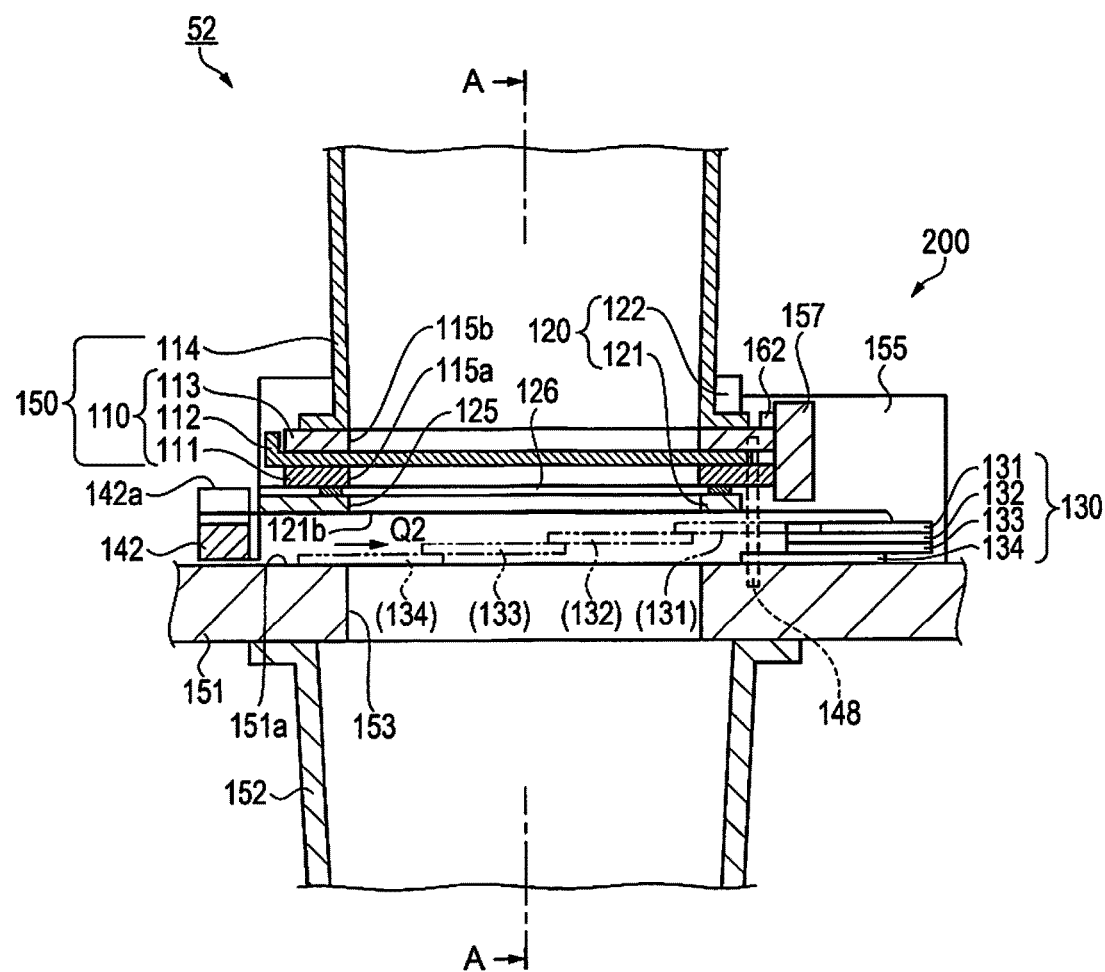
FIG. 3A is a front sectional diagram illustrating an outline of the configuration of the powder supply unit.

The powder supply unit (the powder supply device) 52 is provided with a storage chamber 152, an installation unit 200, and a powder storage container 150 (refer to FIG. 3A). As illustrated in FIG. 2, a plurality of the powder supply units 52 is provided, one for each of the powder storage containers 150 which serve as containers which are classified according to the type of the powder stored therein. In FIG. 2, for the convenience of explanation, locations are depicted in which the powder storage container 150 is not disposed and the installation unit 200 is exposed. However, the powder storage containers 150 may be installed on all of the installation units 200, the powder storage containers 150 may be installed on the installation units 200 of favorable positions as in the drawing, and the installation positions are arbitrary.

The powder is supplied to the tube 54 from the powder supply unit 52 which is selected according to the specification of a sheet S to be formed. The supply port of the powder from the powder supply unit 52 in the transport path is connected (communicated) with each of the tubes 54 and the powder of the storage chamber 152 is supplied to the inside of the tube 54 via the transport path. The powder which is supplied from the powder supply unit 52 includes a resin for binding a plurality of fibers. At the time at which the resin is supplied, the plurality of fibers is not bound. The resin melts when the resin passes through the sheet forming unit 80 and causes the plurality of fibers to bind. The detailed configuration of the powder supply unit (the powder supply device) 52 will be described later (refer to FIGS. 3 to 15).

The powder which is supplied from the powder supply unit 52 is a thermoplastic resin or a heat curing resin, for example, the powder is AS resin, ABS resin, polypropylene, polyethylene, polyvinyl chloride, polystyrene, acrylic resin, polyester resin, polyethylene terephthalate, polyphenylene ether, polybutylene terephthalate, nylon, polyamide, polycarbonate, polyacetal, polyphenylene sulfide, polyether ether ketone, or the like. These resins may be used alone or in a mixture, as appropriate.

Depending on the type of sheet to be manufactured, in addition to a resin for binding the fibers, the powder which is supplied from the powder supply unit 52 may include a coloring agent for coloring the fibers (for example, a substance obtained by kneading and pulverizing a pigment such as a cyan pigment, a magenta pigment, and a yellow pigment and a resin), an aggregation suppressing agent such as silica for suppressing the aggregation of the fibers, a flame retardant for rendering the fibers and the like less susceptible to burning (for example, an inorganic hydroxide such as aluminum hydroxide, guanidine phosphate, a melamine sulfate, a melamine polyphosphate, or the like), a deodorant (for example, activated carbon, zeolite, or the like), an aromatic (for example, natural powders such as sandalwood or agarwood fragrant wood powder, coffee powder, tea powder, bamboo powder, and orange peel powder, fragrance capsule encapsulating oil such as cypress oil or lavender perfume in melamine resin, or the like).

As illustrated in FIG. 1, the mixture (the mixture of a powder containing the first sorted matter and at least the binding resin) which is mixed by the mixing unit 50 is transferred from the tube 54 to the accumulating unit 60.

The mixture which passes through the mixing unit 50 enters the accumulating unit 60 from an inlet 62 and the accumulating unit 60 untangles the tangled defibrated matter (the fibers) causes the result to fall while scattering the result in the air. Furthermore, in a case in which the resin of the powder which is supplied from the powder supply unit 52 is in fiber form, the accumulating unit 60 untangles the tangled resin. Accordingly, the accumulating unit 60 is capable of causing the mixture to accumulate in the second web forming unit 70 with good uniformity.

As the accumulating unit 60, a cylindrical sieve which rotates is used. The accumulating unit 60 includes a mesh and causes the fibers and the particles which are smaller than the size of the aperture of the mesh included in the mixture which passes through the mixing unit 50 (the matter which passes through the mesh) to fall. The configuration of the accumulating unit 60 is the same as the configuration of the sorting unit 40, for example.

The "sieve (sieve)" of the accumulating unit 60 may not include a function of sorting a specific target matter. In other words, the "sieve" which is used as the accumulating unit 60 means a constituent element provided with a mesh and the accumulating unit 60 may cause all of the mixture which is introduced to the accumulating unit 60 to fall.

The second web forming unit 70 accumulates the passed matter which passes through the accumulating unit 60 to form a web W. The second web forming unit 70 includes, for example, the mesh belt 72, the stretch roller 74, and the suction mechanism 76.

The passed matter which passes through the openings (the openings in the mesh) of the accumulating unit 60 accumulates on the mesh belt 72 while the mesh belt 72 moves. The mesh belt 72 is stretched by the stretch roller 74 and is configured to not easily allow the passed matter to pass therethrough and to allow air to pass therethrough. The mesh belt 72 moves due to the stretch roller 74 rotating on its axis. The web W is formed on the mesh belt 72 due to the passed matter which passes through the accumulating unit 60 continuously falling and accumulating while the mesh belt 72 continuously moves.

The suction mechanism 76 is provided under the mesh belt 72 (the opposite side from the accumulating unit 60 side). The suction mechanism 76 is capable of generating a downward airflow (an airflow from the accumulating unit 60 toward the mesh belt 72). Accordingly, it is possible to increase the discharge speed from the accumulating unit 60.

As described above, the web W is formed in a state including much air and softly expanded through passing through the accumulating unit 60 and the second web forming unit 70 (a web forming process). The web W which is accumulated on the mesh belt 72 is transported to the sheet forming unit 80.

In the example of the drawings, a moisture adjusting unit 78 which adjusts the moisture of the web W is provided. The moisture adjusting unit 78 is capable of adjusting a quantity ratio of the web W and water by adding water or water vapor to the web W.

The sheet forming unit 80 pressurizes and heats the web W which is accumulated on the mesh belt 72 to form the sheet S. In the sheet forming unit 80, it is possible to bind the plurality of fibers in the mixture via the powder which includes the binding resin alternately by applying heat to the powder mixture including the defibrated matter and the binding resin which are mixed on the web W.

The sheet forming unit 80 is provided with a pressurizing unit 82 which pressurizes the web W and a heating unit 84 which heats the web W which is pressurized by the pressurizing unit 82. The pressurizing unit 82 is configured by a pair of calendar rollers 85 and applies a pressure to the web W. The thickness of the web W is reduced by being pressurized and the density of the web W is increased. The heating unit 84 is provided with a pair of heating rollers 86. The web W which is pressurized by the calendar rollers 85 is heated by the heating rollers 86 and the sheet S is molded by melting the resin and binding the fibers. Here, the calendar rollers 85 (the pressurizing unit 82) is capable of applying a higher pressure to the web W than the pressure which is applied to the web W by the heating rollers 86 (the heating unit 84). The number of the calendar rollers 85 and the heating rollers 86 is not particularly limited.

The cutting unit 90 cuts the sheet S which is formed by the sheet forming unit 80. In the example of the drawings, the cutting unit 90 includes a first cutting unit 92 which cuts the sheet S in a direction which intersects the transport direction of the sheet S and a second cutting unit 94 which cuts the sheet S in a direction which is parallel to the transport direction. The second cutting unit 94 cuts the sheet S which passes through the first cutting unit 92, for example.

According to the above description, the single sheet S of a predetermined size is formed. The single sheet S which is cut is discharged to a discharge portion 96.

Next, a description will be given of the configuration of the powder supply unit (the powder supply device) 52 of the sheet manufacturing apparatus 100 with reference to FIGS. 3A to 15.

The powder supply unit 52 is provided with a container (hereinafter the powder storage container) for the sheet manufacturing apparatus 100 which stores the powder and a storage chamber including an installation unit on which the powder storage container is installed and into which the powder is inserted from the inlet of the installed powder storage container. In the powder supply unit 52, when the storage chamber in which the inlet is open is communicated with the powder storage container in which the opening is open, the powder which is stored in the powder storage container is inserted into the storage chamber due to gravity. It is also possible to refer to the powder storage container as a cartridge. Hereinafter, a description will be given of the specific configuration of the powder supply unit in the sheet manufacturing apparatus 100.

Figure 3B:
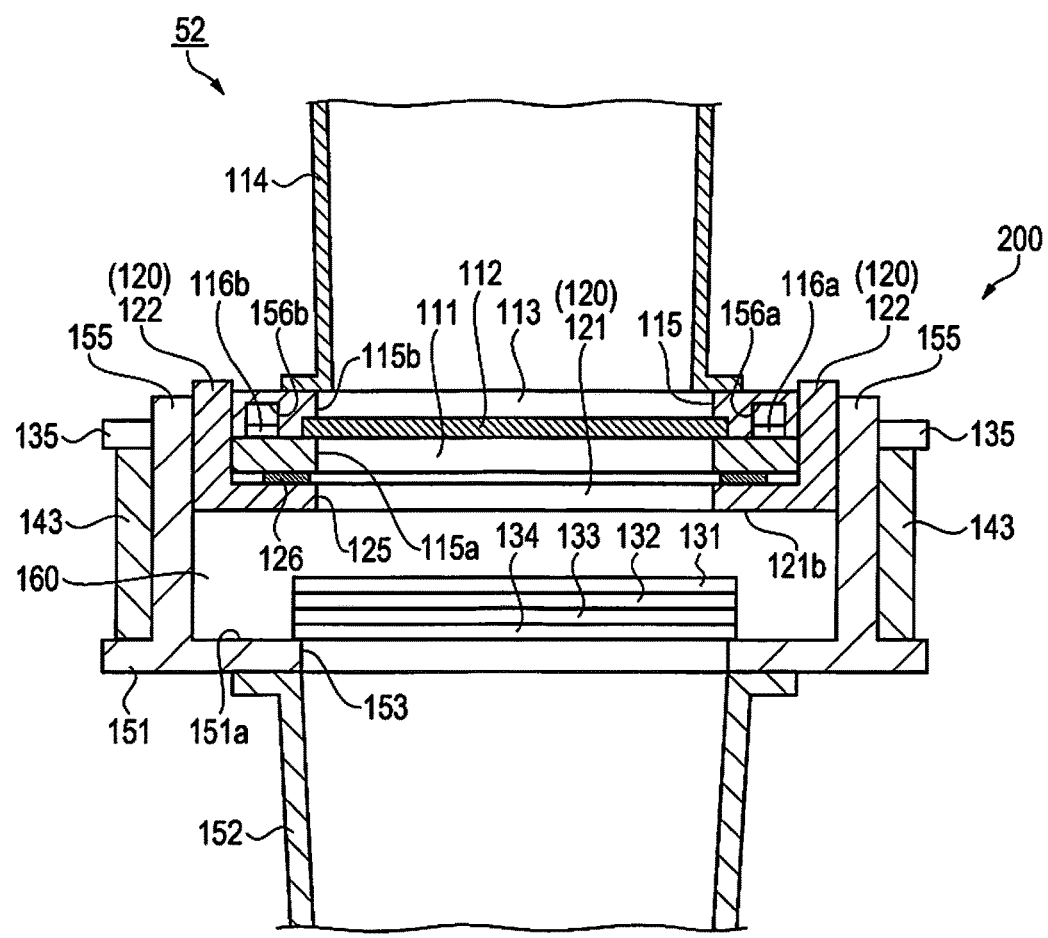
FIG. 3B is a sectional diagram taken along A-A of FIG. 3A illustrating an outline of the configuration of the powder supply unit.
Figure 3C:
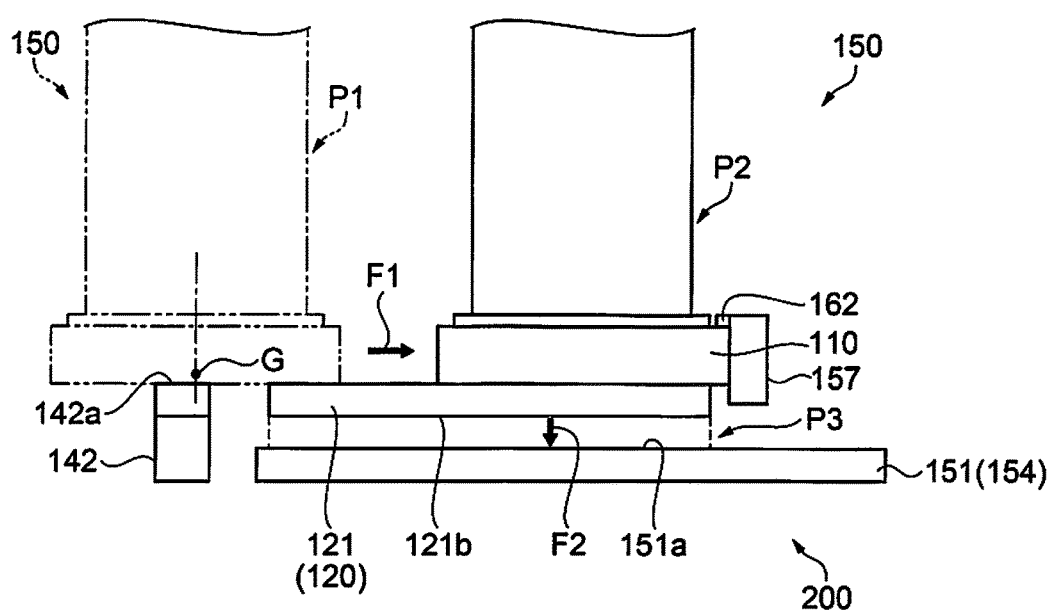
FIG. 3C is a schematic view illustrating a movement state of a powder storage container (a cartridge).
Figure 4:
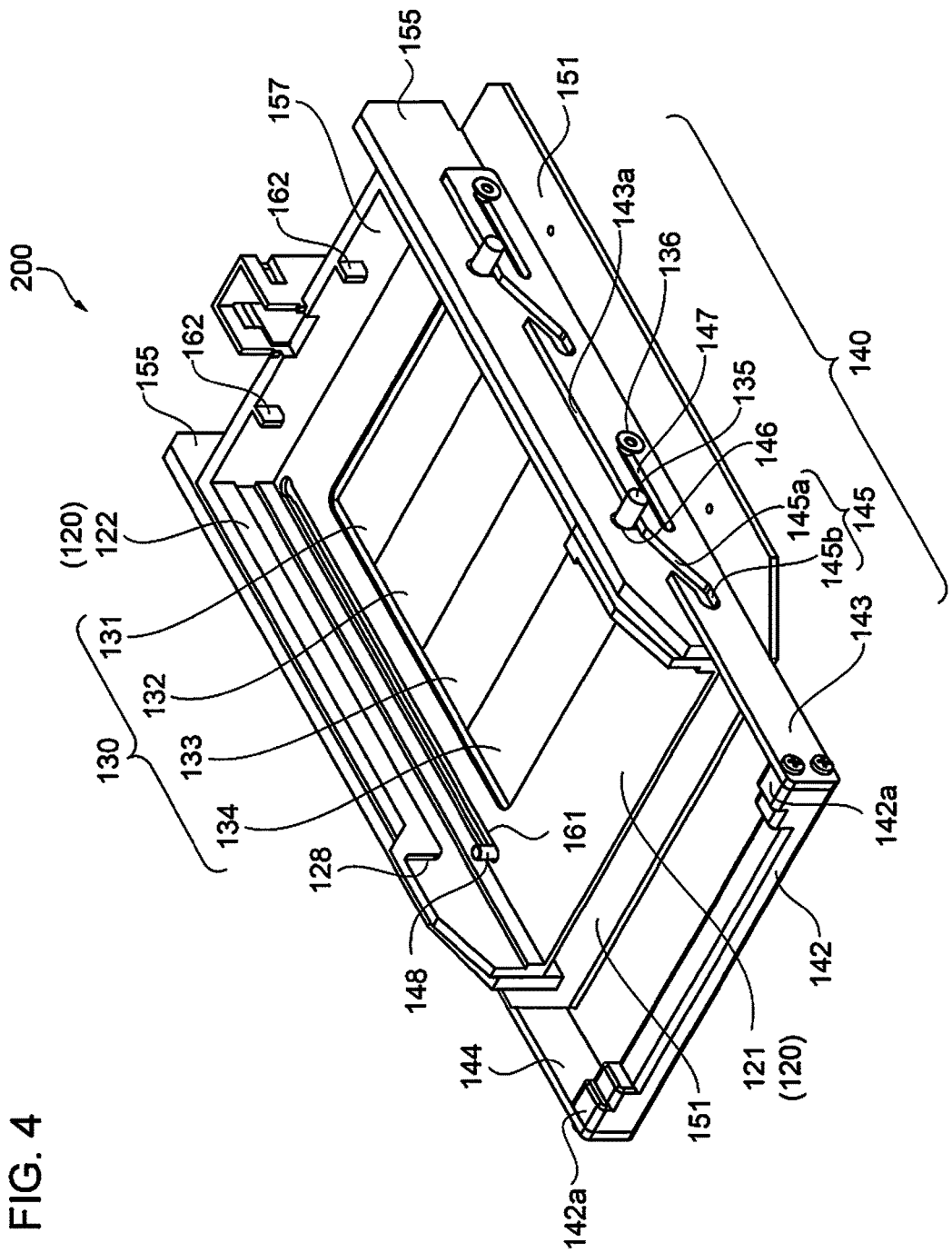
FIG. 4 is a perspective view illustrating an outline of an installation unit of the powder storage container (the cartridge).
Figure 5:
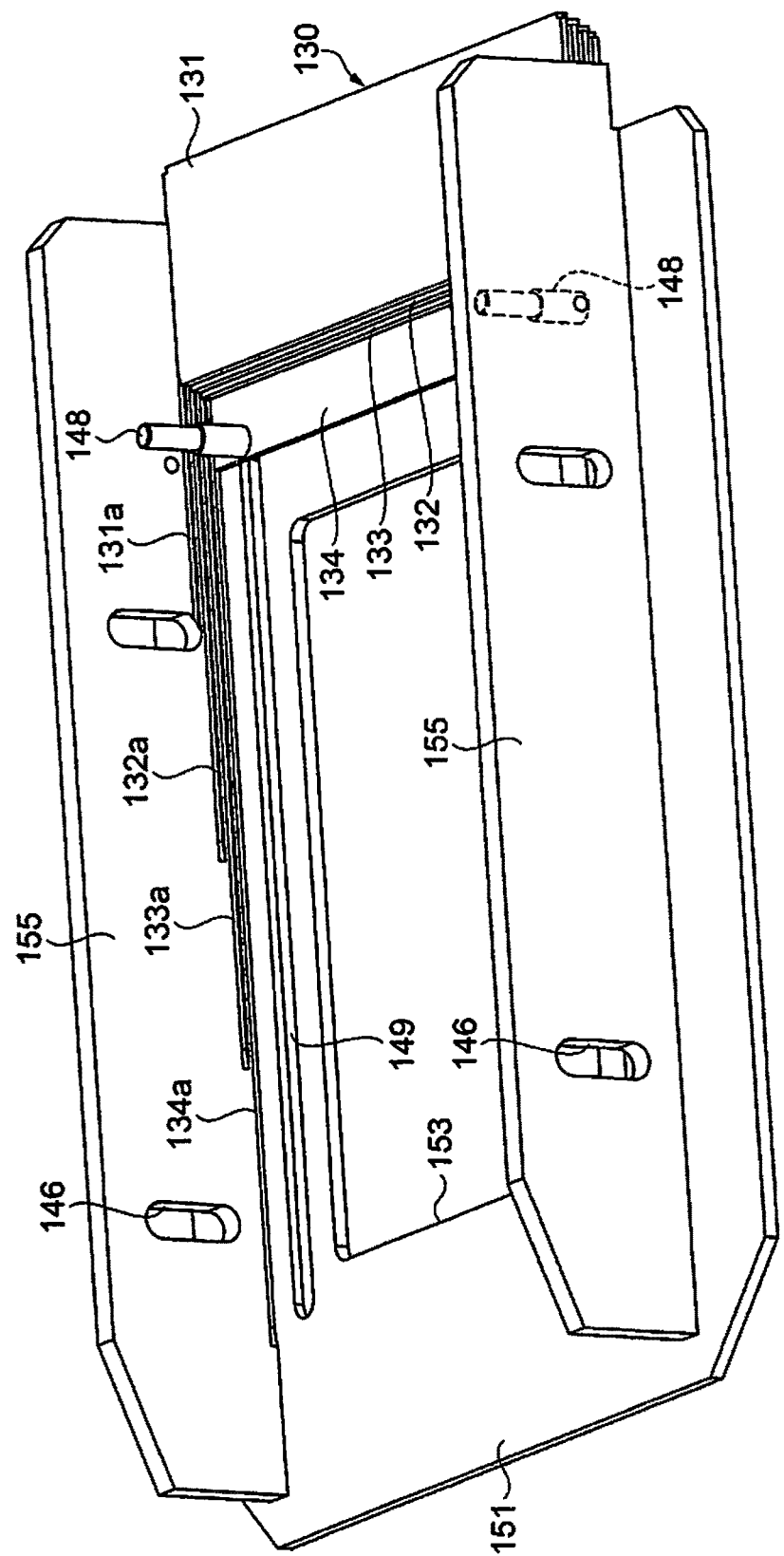
FIG. 5 is a perspective view illustrating the configuration of a first shutter (a shutter movement mechanism).
Figure 6:
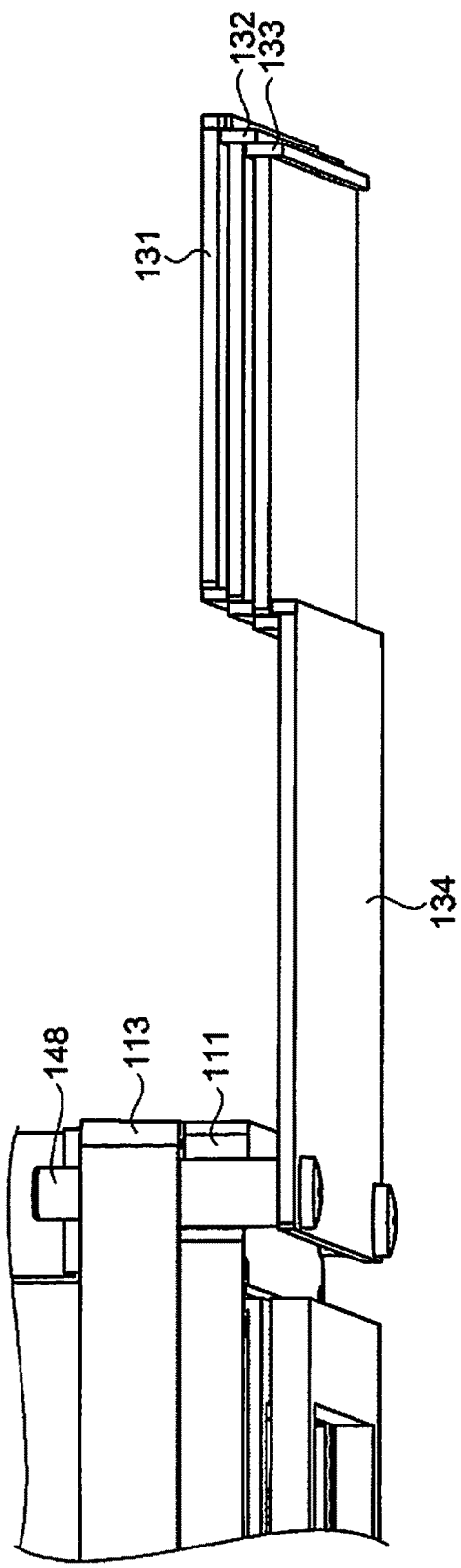
FIG. 6 is a perspective view illustrating the configuration of the first shutter (the shutter movement mechanism).
Figure 7:
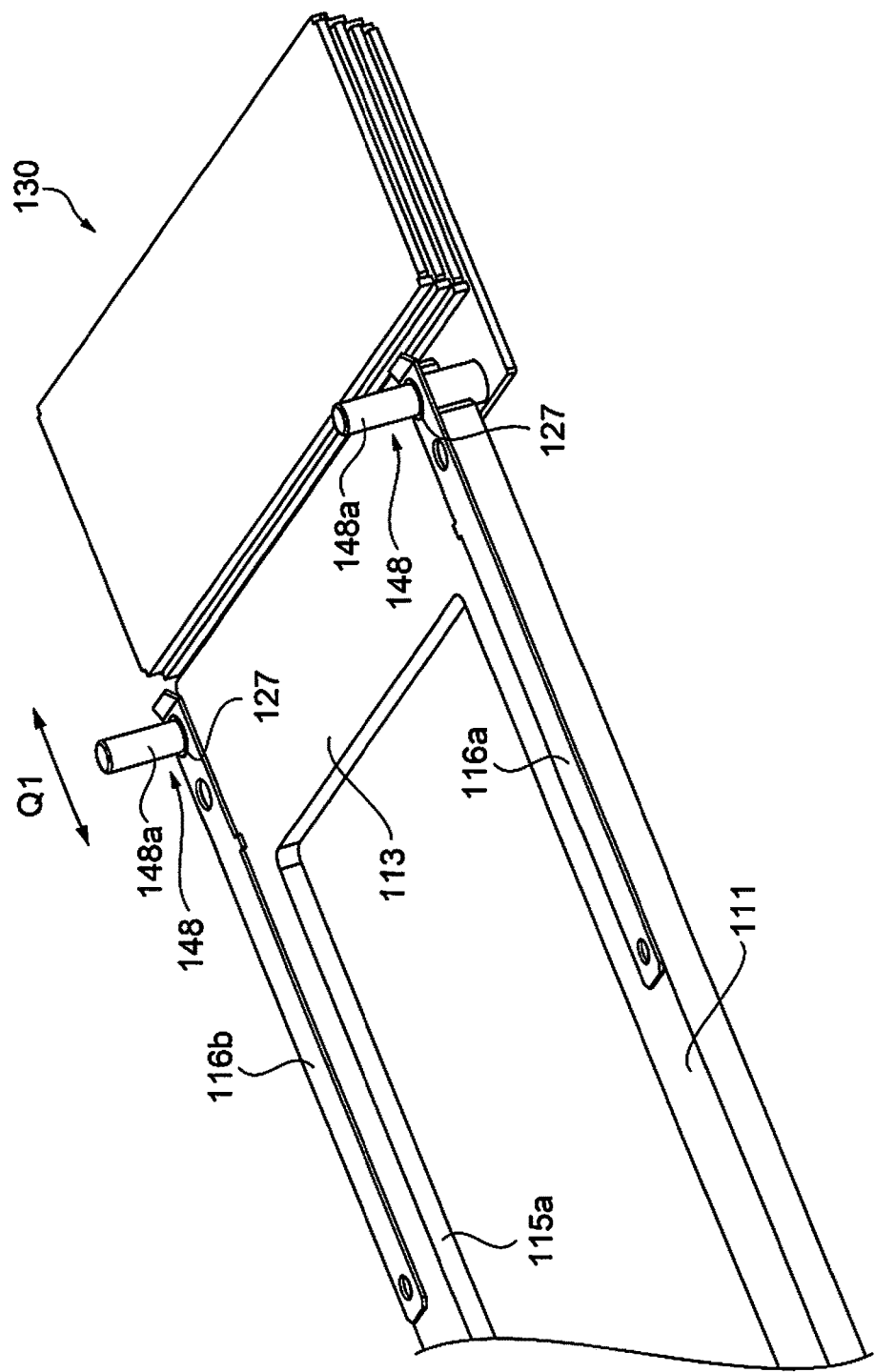
FIG. 7 is a disposition view of an elastic body which configures a locking mechanism.
Figure 8:
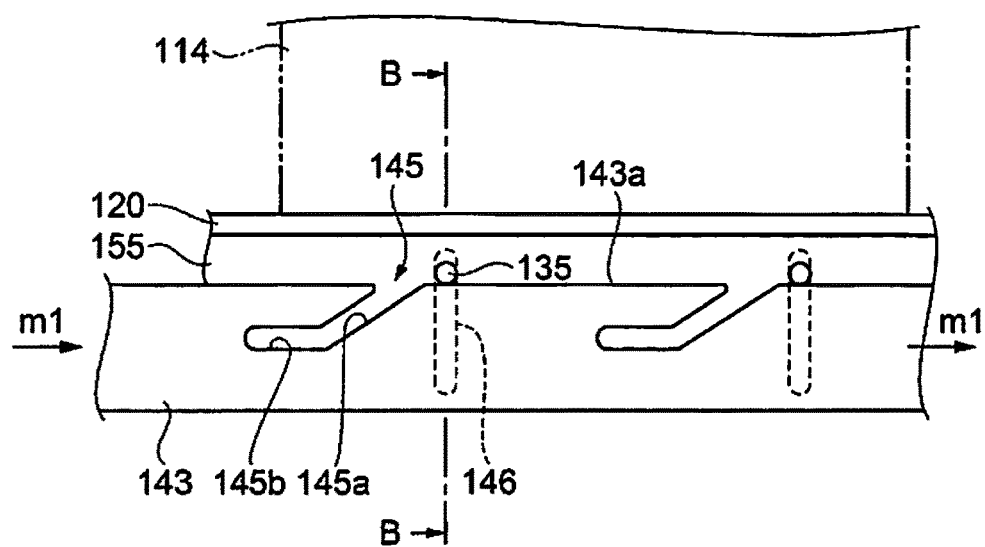
FIG. 8 is a front view illustrating the operation of the installation unit of the powder storage container (the cartridge).
Figure 9:
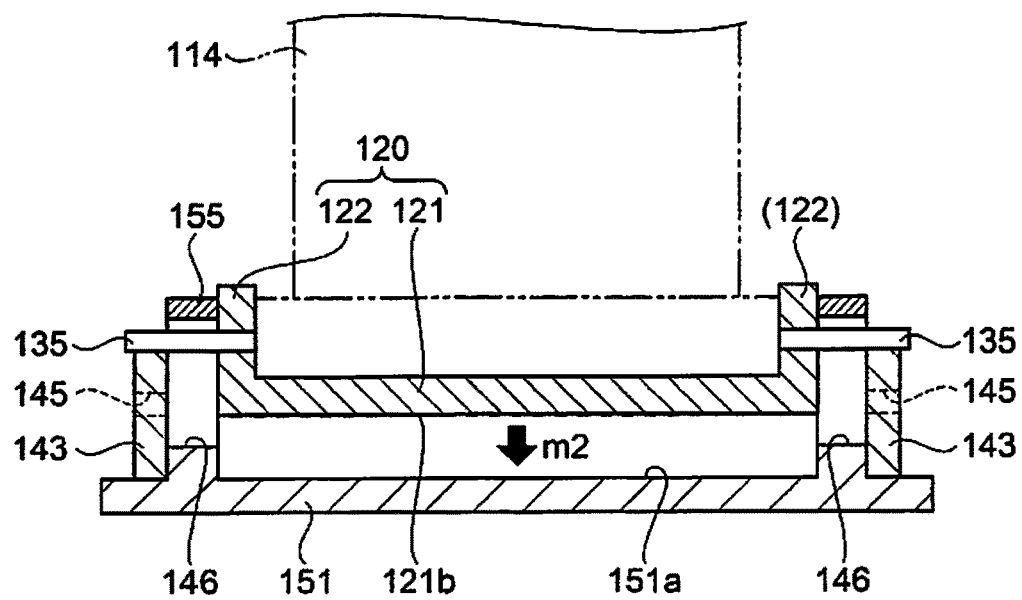
FIG. 9 is a sectional diagram taken along B-B of FIG. 8 illustrating the operation of the installation unit.
Figure 10:
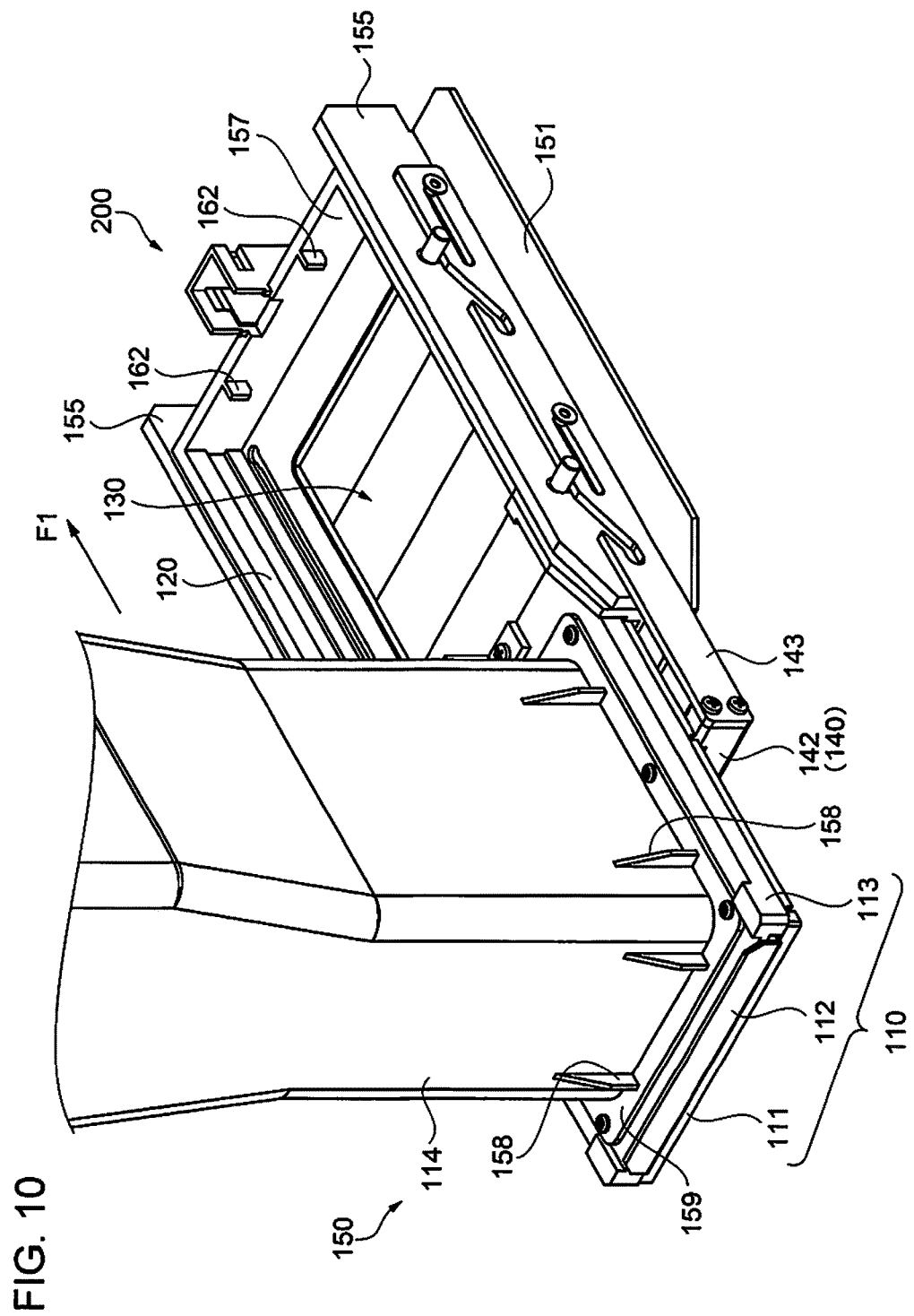
FIG. 10 is a perspective view illustrating a mounting state of the powder storage container (the cartridge).
Figure 11:
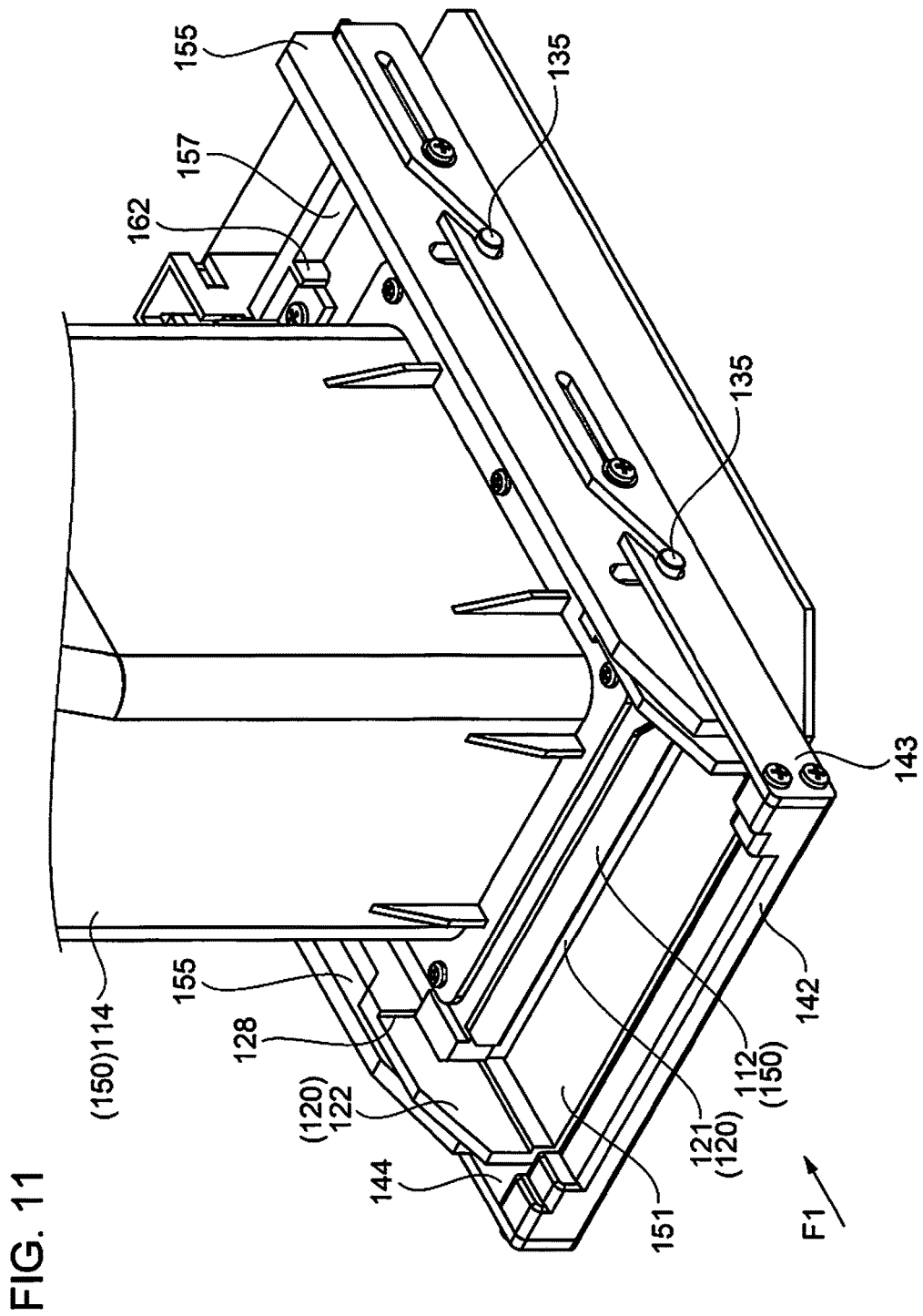
FIG. 11 is a perspective view illustrating an outline of the installation unit to which the powder storage container (the cartridge) is installed.
Figure 12:
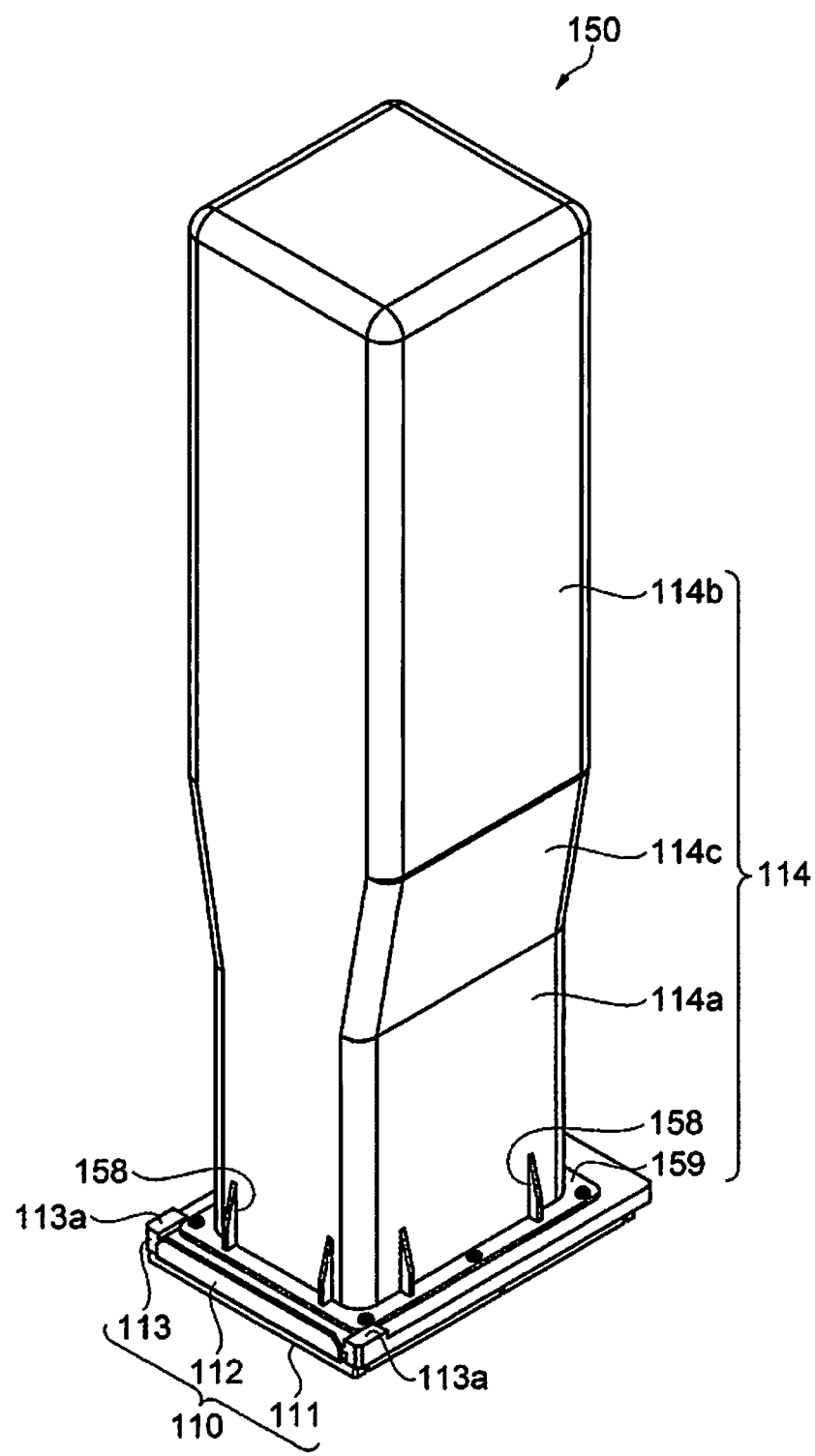
FIG. 12 is a front perspective view illustrating the external appearance of the cartridge (the powder storage container).
Figure 13:
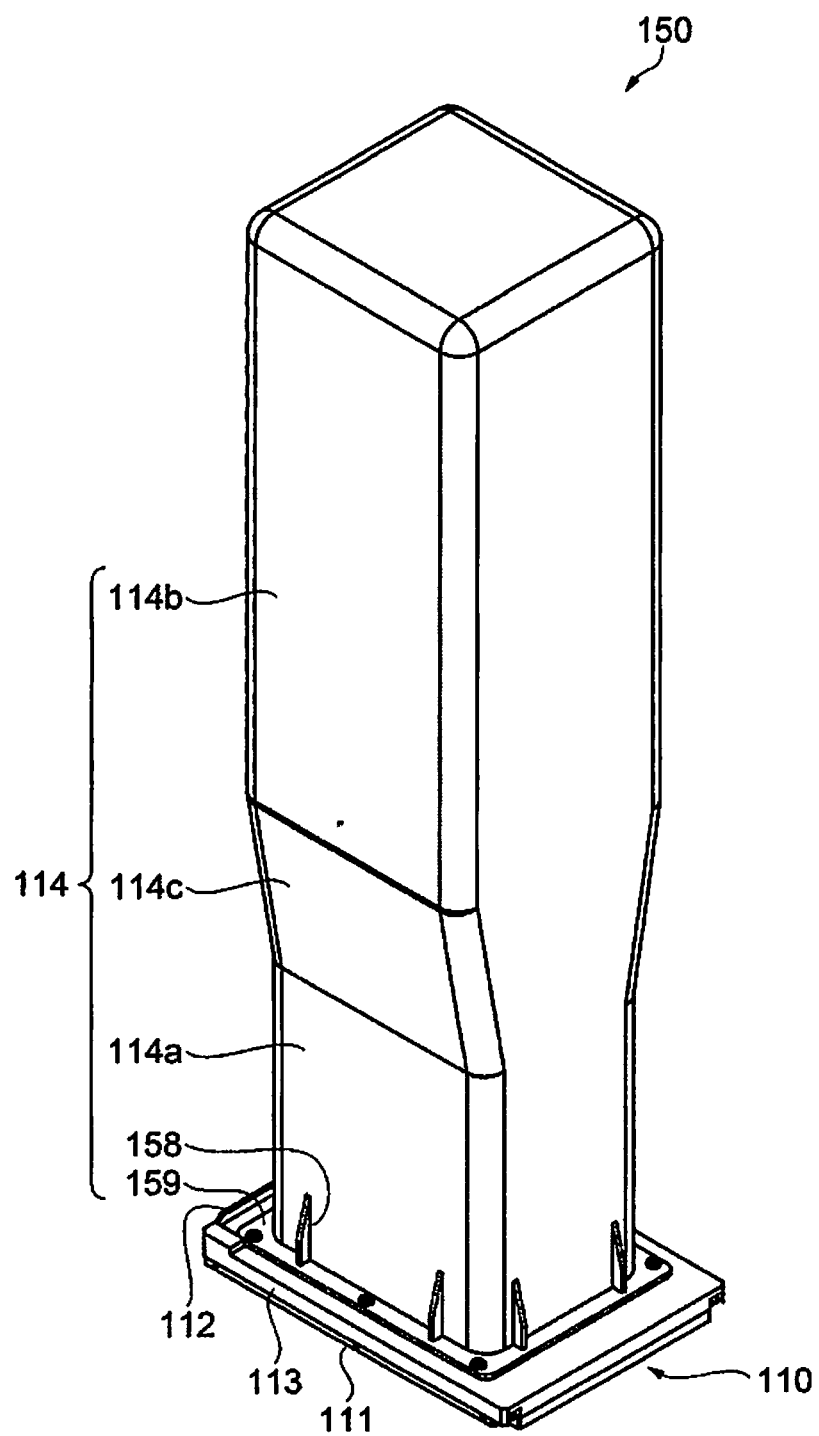
FIG. 13 is a rear perspective view illustrating the external appearance of the cartridge (the powder storage container).
Figure 14A:
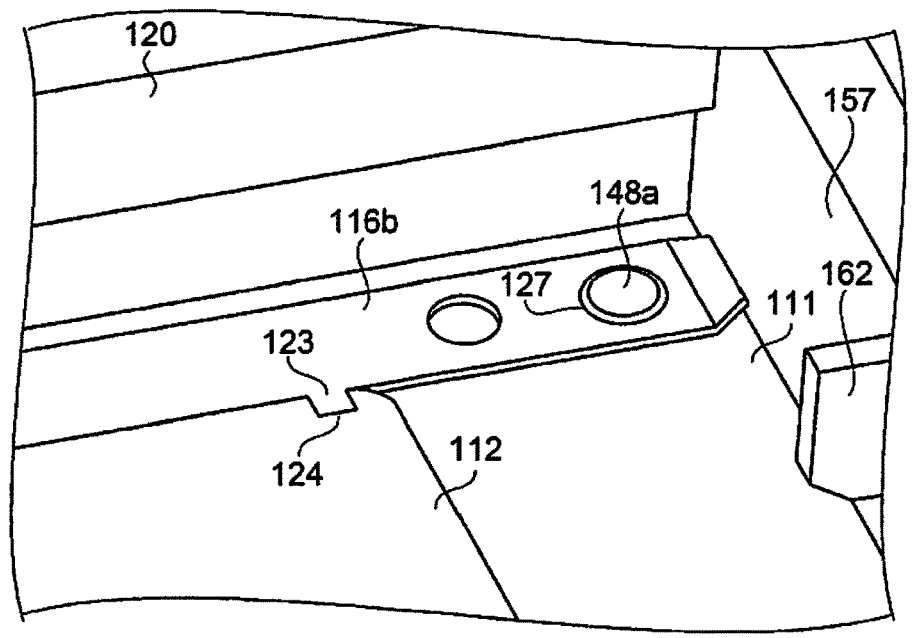
FIG. 14A is a perspective view illustrating a locked state of a locking mechanism of a second shutter.
Figure 14B:
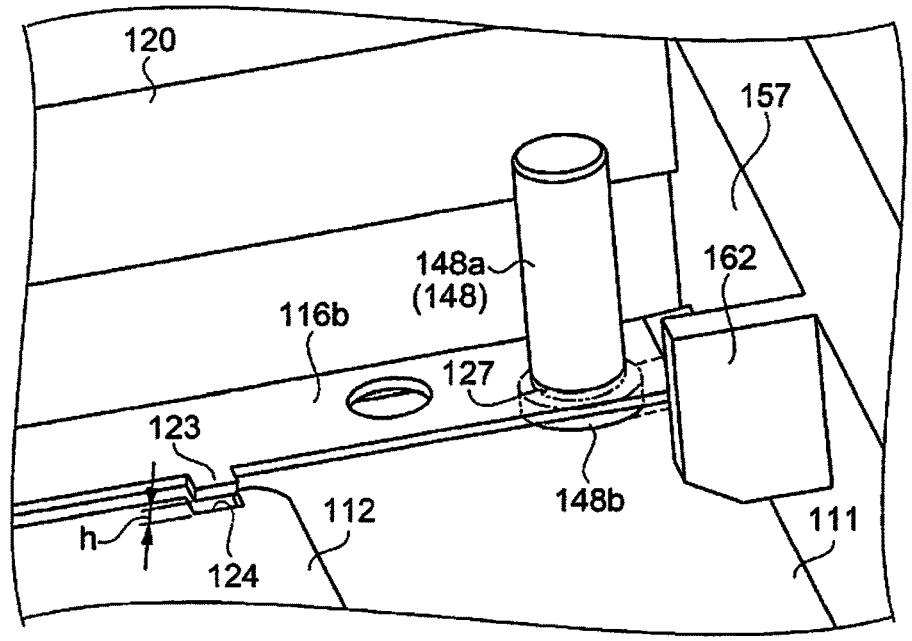
FIG. 14B is a perspective view illustrating an unlocked state of an unlocking mechanism of the second shutter.
Figure 15A:
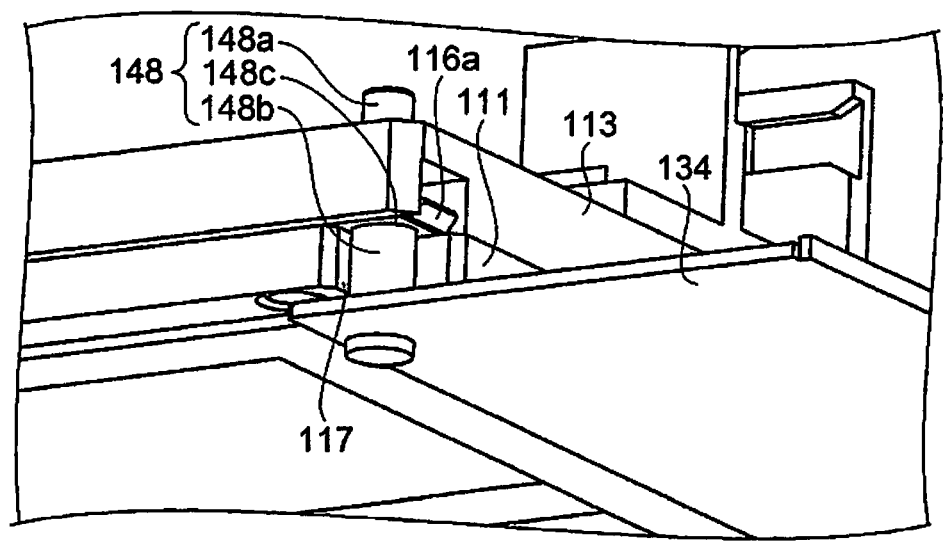
FIG. 15A is a perspective view illustrating a cutout portion of a first holder flange.
Figure 15B:
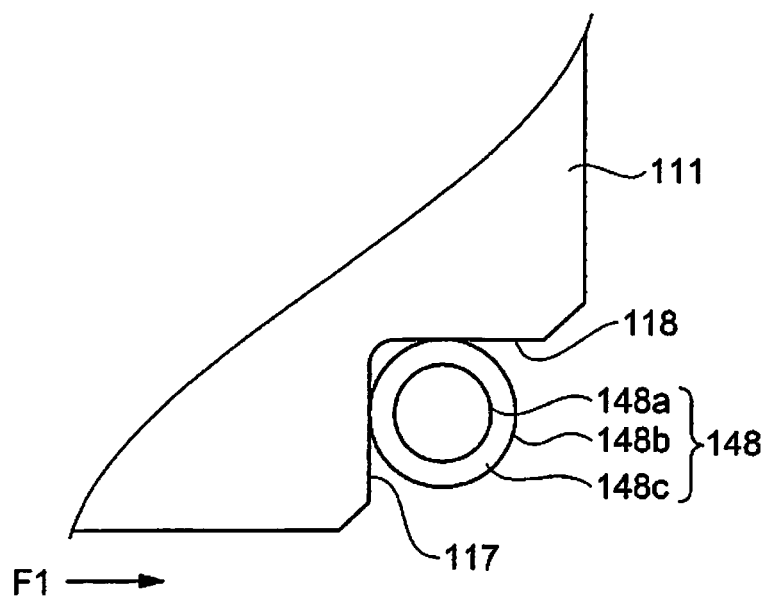
FIG. 15B is a plan view illustrating the cutout portion of the first holder flange.
Figure 15C:
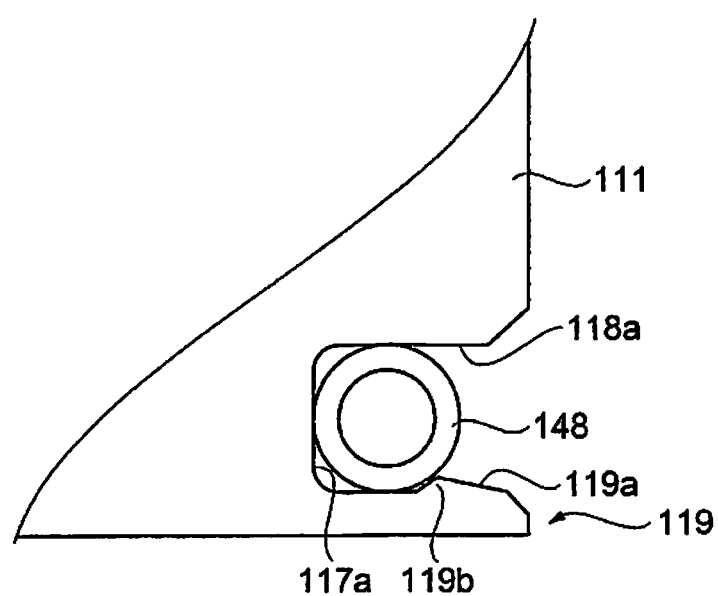
FIG. 15C is a plan view illustrating a modification example of the cutout portion of the first holder flange.

FIGS. 3A to 15 are diagrams for explaining an outline of the configuration of the powder supply unit. FIG. 3A is a front sectional diagram illustrating an outline of the configuration of the powder supply unit, FIG. 3B is a sectional diagram taken along A-A of FIG. 3A, and FIG. 3C is a schematic view illustrating a movement state (an installation operation) of a powder storage container (a cartridge). FIG. 4 is a perspective view illustrating an outline of an installation unit of the powder storage container (the cartridge) in the storage chamber which configures the powder supply unit. FIG. 5 is a perspective view illustrating the configuration of a first shutter (a shutter movement mechanism) in the installation unit, FIG. 6 is a perspective view illustrating the configuration of the first shutter (the shutter movement mechanism), and FIG. 7 is a disposition view of an elastic body which configures a locking mechanism. FIG. 8 is a front view illustrating the operation of the installation unit of the powder storage container (the cartridge), and FIG. 9 is a sectional diagram taken along B-B of FIG. 8 illustrating the operation of the installation unit. FIG. 10 is a perspective view illustrating a mounting state of the powder storage container (the cartridge), and FIG. 11 is a perspective view illustrating an outline of the installation unit on which the powder storage container (the cartridge) is installed. FIGS. 12 and 13 illustrate the external appearance of the powder storage container (the cartridge), FIG. 12 is a front perspective view, and FIG. 13 is a rear perspective view. FIGS. 14A and 14B illustrate a locking mechanism and an unlocking mechanism of the second shutter, FIG. 14A is a perspective view illustrating the locked state, and FIG. 14B is a perspective view illustrating the unlocked state. FIGS. 15A, 15B, and 15C illustrate a cutout portion of a first holder flange, FIG. 15A is a perspective view, FIG. 15B is a plan view, and FIG. 15C is a plan view illustrating a modification example.

As illustrated in FIGS. 3A, 3B, 3C, and 4, the powder supply unit 52 is provided with the powder storage container (the cartridge) 150 which includes the storage chamber 152, the installation unit 200, and a container portion 114. The powder storage container 150 corresponds to a container. In the powder supply unit 52 of the present embodiment, the powder storage container 150 is configured to be attachable and detachable with respect to the installation unit 200. Specifically, as illustrated in FIGS. 3A and 3B, the installation unit 200 is disposed above the storage chamber 152 and the powder storage container 150 which includes a container connecting unit 110 is disposed above the installation unit 200.

The installation unit 200 is provided with an inlet 153 for receiving the powder including the binding resin which is supplied from the powder storage container 150 which serves as the container, a first shutter 130 for opening and closing the inlet 153, and a shutter movement mechanism which includes a fixing unit 151, fixing guide portions 155, a stepped pin 148, and the like and is for moving (opening and closing) the first shutter 130 along the direction of an arrow Q2 (refer to FIG. 3A).

The installation unit 200 is provided with a mounting portion 120 and an unlocking mechanism. The mounting portion 120 includes a support portion 121 which supports the powder storage container 150 to be capable of moving along a first direction (an arrow F1 illustrated in FIG. 3C) between an installation start position (a position P1 illustrated in FIG. 3C) and an intermediate position (a position P2 illustrated in FIG. 3C) and mounting guide portions 122 (described later). The unlocking mechanism is for unlocking a second shutter 112 which serves as the shutter of the container which is provided in the powder storage container 150 which will be described in detail later when the powder storage container 150 is at an installation completion position (a position P3 illustrated in FIG. 3C).

The installation unit 200 is provided with a slider unit 140 which includes cam grooves 145 and first guide pins 135 for moving the mounting portion 120 along the up-down direction (the second direction). The slider unit 140 is for moving the powder storage container 150 in the up-down direction in a movement region 160 which is positioned between the intermediate position (the position P2) and the installation completion position (the position P3).

The term "the first direction" is the arrow F1 illustrated in FIG. 3C and is a single direction in which the powder storage container 150 and the installation unit 200 are capable of moving relative to one another. The term "the second direction" is a direction which intersects the first direction and is a direction approximately parallel to the gravity direction.

The locking mechanism includes flat springs 116a and 116b which serve as an elastic portion which are disposed at each end portion of both sides of the container connecting unit 110 which is included in the powder storage container 150. The unlocking mechanism includes the mounting portion 120, which is included in the installation unit 200, and the first shutter 130. The locking mechanism and the unlocking mechanism are capable of performing unlocking and locking (engaging) operations in a relationship with the installation unit 200 and the container connecting unit 110. The detailed description will be performed later during the explanation of the second shutter 112 which is included in the powder storage container 150.

Here, a description will be given of the installation operation of the powder storage container 150 in the installation unit 200 using FIGS. 3C, 10, and 11. First, the powder storage container 150 is mounted on the mounting portion 120 at the position P1 which is the installation start position (the state illustrated in the perspective view of FIG. 10). At this time, in the mounting portion 120, a lever portion (a gripping portion) 142 of the slider unit 140 (described later) is pulled out to the front side (the opposite side from the first direction) and a state is assumed in which the lever portion 142 is lifted above the fixing unit 151. The lever portion (the gripping portion) 142 which is pulled out is positioned under the powder storage container 150 and, together with the mounting portion 120, lever support portions 142a which are provided on the lever portion (the gripping portion) 142 support the powder storage container 150.

In this manner, by positioning the lever portion (the gripping portion) 142 which is pulled out under the powder storage container 150, it is possible to prevent the manipulation of the lever portion (the gripping portion) 142 from becoming difficult and to prevent erroneous manipulation of the lever portion (the gripping portion) 142. Since it is possible to position a center of gravity G of the powder storage container 150 which is installed in the direction between the lever support portion 142a and the mounting portion 120 using the lever portion (the gripping portion) 142, it is possible to stabilize the posture when mounting the powder storage container 150 and it is possible to prevent inclination and falling over of the powder storage container 150 during the mounting.

Next, the powder storage container 150 which is mounted on the mounting portion 120 at the position P1 which is the installation start position is caused to slide in the direction (the first direction) of the arrow F1 in the drawing on the mounting portion 120, in other words, the powder storage container 150 is caused to slide to move to the position P2 which is the intermediate position. At this time, the powder storage container 150 uses a front portion guide 157 (refer to FIG. 3A) which is provided on the front portion (the end portion of the first direction side) of the fixing guide portion 155 as a stopper and uses the position at which the container connecting unit 110 abuts on the front portion guide 157 as the stopping position in the first direction. The upward movement of the powder storage container 150 is restricted by the container connecting unit 110 being inserted between top portion guides 162 which protrudes from the front portion guide 157 and the support portion 121 which configures the mounting portion 120. In this manner, the powder storage container 150 at the position P2 which is the intermediate position is positioned by the mounting guide portions 122 (refer to FIG. 3B) which configure the mounting portion 120, the front portion guide 157, and the top portion guides 162.

Next, the powder storage container 150 which is mounted on the mounting portion 120 at the position P2 which is the intermediate position is moved downward which is the direction (the second direction) of an arrow F2 in the drawings together with the mounting portion 120 and a bottom surface 121b of the mounting portion 120 is caused to abut on a top surface 151a of the fixing unit 151 (the state illustrated in the perspective view of FIG. 11). Specifically, the mounting portion 120 is moved downward and installed at the position P3 which is the installation completion position by pushing the lever portion (the gripping portion) 142 which becomes easier to grasp due to the powder storage container 150 moving to the intermediate position (the position P2) and the space above the lever portion 142 becoming vacant in the direction (the first direction) of the arrow F1 in the drawings. A detailed description will be given regarding the movement downward in the explanation of the slider unit 140 later. According to the series of operations which are described above, the installation of the powder storage container 150 ends and the preparation to supply the powder is completed.

In a case in which the powder storage container 150 is removed, it is possible to remove the powder storage container 150 by performing the operations in the opposite order from that described above. Specifically, first, the mounting portion 120 and the powder storage container 150 are moved to the intermediate position (the position P2) by removing the lever portion (the gripping portion) 142, and next, the powder storage container 150 is caused to slide in the opposite direction from the arrow F1 in the drawings to move the powder storage container 150 to the position P1 which is the installation start position. The powder storage container 150 is removed upward at the position P1 which is the installation start position.

A description will be given of the first shutter 130 and the shutter movement mechanism with reference to FIGS. 6 and 7. As illustrated in FIGS. 3A and 6, since the first shutter 130 opens and closes the inlet 153, the first shutter 130 is provided above the storage chamber 152 and between the fixing unit 151 and the powder storage container 150. The first shutter 130 is capable of moving between an open position at which the inlet 153 is opened and a closed position at which the inlet 153 is closed in accordance with the attachment and the detachment of the powder storage container 150 with respect to the installation unit 200. The first shutter 130 is provided with a first plate portion 131, a second plate portion 132, a third plate portion 133, and a fourth plate portion 134 which serve as a plurality of shutter members.

Two of the stepped pins 148 are provided at the end portions of both sides of the fourth plate portion 134 which is the inlet 153 side of the open position. In the present embodiment, the stepped pin 148 corresponds to a first engaging portion. The stepped pin 148 penetrates a long groove hole 161 (refer to FIG. 4) of the support portion 121 (described later) and protrudes upward from the support portion 121. As the plurality of shutter members which configure the first shutter 130, the configuration is not limited to four (four) as described above, and the number of shutter members is arbitrary.

When the powder storage container 150 at the installation start position (the position P1 illustrated in FIG. 3C) is mounted on the mounting portion 120, the two stepped pins 148 (first engaging portions) are inserted into through holes 127 (second engaging portions) which are provided in the flat springs 116a and 116b (refer to FIGS. 3B and 7) which serve as the elastic portion in which the narrow diameter portions 148a are disposed on the container connecting unit 110. In the present embodiment, the stepped pin 148 corresponds to the first engaging portion and the through hole 127 corresponds to the second engaging portion. It is possible to perform the opening and closing of the first shutter 130 in accordance with the attachment and detachment of the powder storage container 150 and the movement from the installation start position (the position P1 illustrated in FIG. 3C) to the intermediate position (the position P2 illustrated in FIG. 3C) due to the narrow diameter portion 148a of the stepped pin 148 and the through holes 127 of the flat springs 116a and 116b which are engaged in this manner.

Specifically, as illustrated in FIG. 7, the stepped pin 148 moves in a direction (the first direction) parallel to an arrow Q1 in accordance with the attachment and the detachment of the powder storage container 150 and the movement from the installation start position (the position P1 illustrated in FIG. 3C) to the intermediate position (the position P2 illustrated in FIG. 3C), and it is possible to perform the opening and closing of the first shutter 130 by pulling out and pushing in the first plate portion 131, the second plate portion 132, the third plate portion 133, and the fourth plate portion 134 in accordance with the attachment and detachment and the movement. The end portions of in the movement direction of the first plate portion 131, the second plate portion 132, the third plate portion 133, and the fourth plate portion 134 form protruding portions and it is possible to perform the movement by allowing the protruding portions to abut on one another.

The plurality of shutter members (the first plate portion 131, the second plate portion 132, the third plate portion 133, and the fourth plate portion 134) are stored in an overlapped state at the open position of the first shutter 130, and the plurality of shutter members are pulled out to stop the inlet 153 by the two stepped pins 148 at the closed position of the first shutter 130. In FIG. 3A, the plurality of shutter members which are in a pulled-out state are displayed using double-dot dashed lines (imaginary lines).

As illustrated in FIG. 5, in the first plate portion 131, the second plate portion 132, the third plate portion 133, and the fourth plate portion 134, fixing guide portions 155 are provided to stand along the first direction on the end portions of both sides of the fixing unit 151 in the direction (the third direction) which intersects the movement direction (the first direction) from the installation start position to the intermediate position of the powder storage container 150. A receiving groove is formed along the first direction in the fixing guide portion 155. The receiving groove includes a first receiving groove 131a corresponding to the first plate portion 131, a second receiving groove 132a corresponding to the second plate portion 132; a third receiving groove 133a corresponding to the third plate portion 133, and a fourth receiving groove 134a corresponding to the fourth plate portion 134. The first plate portion 131, the second plate portion 132, the third plate portion 133, and the fourth plate portion 134 are guided to move by the respective receiving grooves which are formed in the fixing guide portions 155. In this manner, the installation unit 200 of the present embodiment is configured to include the first shutter 130 and the shutter movement mechanism which opens and closes the first shutter 130.

As illustrated in FIGS. 3A and 3B, the fixing unit 151 is positioned between the mounting portion 120 and the storage chamber 152 and is fixed to the main body of the sheet manufacturing apparatus 100. The fixing unit 151 includes the fixing guide portions 155 which are provided to stand on the end portions of both sides in the third direction which intersects the movement direction (the first direction) of the powder storage container 150. The center portion of the fixing unit 151 is provided with the inlet 153 which penetrates the obverse and reverse sides of the fixing unit 151. Escape recessed portions 149 for preventing the stepped pins 148 and the fixing unit 151 from interfering with one another when the stepped pins 148 move are provided on both sides in the third direction of the inlet 153 in the top surface of the fixing unit 151. The escape recessed portions 149 are disposed along the edges of the inlet 153 to extend in the first direction (refer to FIG. 5). The escape recessed portions 149 may be through holes and may be bottomed grooves. A first sliding guide portion 146 which is a long-hole shaped penetrating groove and a second guide pin 136 (refer to FIG. 4) which protrudes from the fixing guide portion 155 and is fixed are installed in the fixing guide portion 155.

As illustrated in FIGS. 3A and 3B the mounting portion 120 includes the support portion 121 which is present above the fixing unit 151 and supports the powder storage container 150 such that the powder storage container 150 is capable of moving along the first direction between the installation start position (the position P1 illustrated in FIG. 3C) and the intermediate position (the position P2 illustrated in FIG. 3C), and the mounting guide portions 122 which are provided to stand on the end portions of both sides of the mounting portion 120 in the third direction which intersects the movement direction (the first direction) of the powder storage container 150. An opening 125 which penetrates the obverse and the reverse of the support portion 121 is provided in the center portion of the support portion 121. Long groove holes 161 (refer to FIG. 4) which penetrate the obverse and the reverse of the support portion 121 and in which the stepped pins 148 are capable of sliding are provided in both sides in the third direction of the opening 125 along the first direction. The stepped pins 148 penetrate the long groove holes 161 and protrude to above the support portion 121. Two of the first guide pins 135 are provided for each of the mounting guide portions 122 of both sides to protrude in a direction perpendicular to the surfaces of the mounting guide portions 122 which the first guide pins 135 are provided to stand on. The first guide pins 135 are capable of moving the mounting portion 120 along the up-down direction (the second direction) by sliding on the cam grooves 145 which are provided in the slider unit 140 (described later).

An end wall portion 128 which serves as an abutting portion is provided on the mounting guide portion 122 on the end side which is positioned in the opposite direction from the direction (the first direction) from the installation start position (the position P1 illustrated in FIG. 3C) toward the intermediate position (the position P2 illustrated in FIG. 3C) when the powder storage container 150 is mounted on the mounting portion 120. When the powder storage container 150 is mounted on the mounting portion 120, the end wall portion 128 which serves as the abutting portion is positioned at a position at which a flange convex portion 113a which serves as a convex portion of the end portion of a second holder flange 113 (described later) interferes and a position which does not interfere with the second holder flange 113 of the side on which the flange convex portion 113a is not provided. Together with the flange convex portion 113a of the end portion of the second holder flange 113 (described later), the end wall portion 128 is capable of preventing the powder storage container 150 from being mounted in a reverse orientation and is capable of demarcating the mounting orientation of the powder storage container 150.

The slider unit 140 has a function of moving the mounting portion 120 along the up-down direction (the second direction) and moving the powder storage container 150 between the intermediate position (the position P2 illustrated in FIG. 3C) and the installation completion position (the position P3 illustrated in FIG. 3C). Hereinafter, a description will be given of the configuration and the operation of the slider unit 140 with reference to FIGS. 4, 8, and 9.

As illustrated in FIG. 4, the slider unit 140 is provided with sliding plates 143 and 144, the cam grooves 145 which are provided in the sliding plates 143 and 144, the first guide pins 135 which are provided to protrude from the mounting guide portions 122 which are provided to stand on both sides of the mounting portion 120 and which abut on top end surfaces 143a of the sliding plates 143 and 144 via the first sliding guide portion 146 which is provided on the fixing guide portion 155, the second guide pins 136 which protrude from the fixing guide portion 155 and are fixed, and second sliding guide portions 147 which are provided in the sliding plates 143 and 144 and into which the second guide pins 136 are inserted.

Here, the fixing guide portion 155 which are provided to stand on the fixing unit 151 are positioned between the sliding plates 143 and 144 and the mounting guide portions 122. Of the ends of both sides of each of the sliding plates 143 and 144, one end which is positioned on the opposite side from the first direction is fixed to both end portions of the lever portion (the gripping portion) 142. In other words, the two sliding plates 143 and 144 are fixed to both sides to interpose the lever portion (the gripping portion) 142.

In the lever portion (the gripping portion) 142, it is possible to manipulate (operate) the slider unit 140 by pulling (moving in the first direction) and pulling (moving in the opposite direction from the first direction) the lever portion (the gripping portion) 142. It is preferable that the lever portion (the gripping portion) 142 be positioned under the powder storage container 150 when the powder storage container 150 is at the installation start position (the position P1 illustrated in FIG. 3C) and be positioned closer to the front side (the opposite side from the first direction) in the installation direction than the powder storage container 150 when the powder storage container 150 is at the intermediate position (the position P2 illustrated in FIG. 3C). The lever support portions 142a which protrude upward from the lever portion (the gripping portion) 142 are provided on the end portions of both sides of the lever portion (the gripping portion) 142. Together with the mounting portion 120, the lever support portions 142a are capable of supporting the powder storage container 150 which is mounted when the powder storage container 150 is at the installation start position (the position P1 illustrated in FIG. 3C).

By disposing the lever portion (the gripping portion) 142 in this manner, when the powder storage container 150 is not at the intermediate position (the position P2 illustrated in FIG. 3C), in other words, when at least the powder storage container 150 is at the installation start position (the position P1 illustrated in FIG. 3C), since the lever portion (the gripping portion) 142 is below the powder storage container 150, the manipulation of the lever portion (the gripping portion) 142 becomes difficult and it is possible to prevent erroneous manipulation.

The expression "below the powder storage container 150" refers to the inlet 153 side with respect to the powder storage container 150 and the expression "the front side in the installation direction" refers to the front side which is the opposite side with respect to the direction (the first direction) which is lined up in the order of the installation start position (the position P1 illustrated in FIG. 3C) and the intermediate position (the position P2 illustrated in FIG. 3C), that is, the installation start position (the position P1 illustrated in FIG. 3C) side.

The cam grooves 145 are penetrating grooves which penetrate the sliding plates 143 and 144 and have a width at which it is possible to insert and slide the first guide pins 135, include inclined portions 145a which go from horizontal portions 145b which are positioned at the center portions of the sliding plates 143 and 144 gradually toward the top surfaces, and are open to the top end surface 143a sides of the sliding plates 143 and 144. The slider units 140 are provided in two locations on the outside of the fixing guide portions 155 which are provided to stand on the fixing unit 151. The cam grooves 145, the first guide pins 135, the second guide pins 136, and the second sliding guide portions 147 are provided two each on the sliding plates 143 and 144.

Hereinafter, a description will be given of the operation of the slider unit 140 with reference to FIGS. 8 and 9. A downward force (gravity) is always applied to the mounting portion 120 in the vertical direction (the second direction) due to the weight of the mounting portion 120 itself or the powder supply unit 52 which is mounted. The slider unit 140 is capable of moving the mounting portion 120 in the up-down direction along the second direction (an arrow m2) by using the weight of the mounting portion 120 on which the powder supply unit 52, which is mounted on the mounting portion 120 as described earlier, is mounted and the weight of the slider unit 140 itself to move the sliding plates 143 and 144 in the front-back direction along the first direction (an arrow m1).

Specifically, by pulling out the lever portion (the gripping portion) 142 in the direction (the opposite direction from the first direction) distancing from the fixing unit 151, the first guide pins 135 which are fixed on the mounting guide portion 122 slide upward conforming to the inclined portions 145a of the cam grooves 145 and assume a state of reaching and abutting on the top end surfaces 143a of the sliding plates 143 and 144 (the state illustrated in FIGS. 8 and 9). Since the first guide pins 135 are guided by the first sliding guide portion 146 of the fixing guide portion 155, it is possible to move the mounting guide portion 122 upward with respect to the fixing guide portion 155. The state in which the first guide pins 135 abut on the top end surfaces 143a of the sliding plates 143 and 144 becomes a state in which it is possible to install the powder storage container 150 on the mounting portion 120. This state corresponds to the installation start position (the position P1 illustrated in FIG. 3C) at which the powder storage container 150 is installed on the mounting portion 120.

Meanwhile, by moving the lever portion (the gripping portion) 142 in the direction (the first direction illustrated by the arrow m1) approaching the fixing unit 151, the first guide pins 135 which are fixed to the mounting guide portion 122 slide downward conforming to the inclined portions 145a of the cam grooves 145, reach the horizontal portions 145b which are positioned at the center portions of the sliding plates 143 and 144, and assume the abutting state. In the same manner as described earlier, since the first guide pins 135 are guided by the first sliding guide portions 146 of the fixing guide portion 155, it is possible to move the mounting guide portion 122 downward (the direction illustrated by the arrow m2 in FIG. 9) with respect to the fixing guide portion 155. In other words, according to this movement, it is possible to move the powder storage container 150 and the mounting portion 120 from (the position P2 illustrated in FIG. 3C) to the installation completion position (the position P3 illustrated in FIG. 3C), and it is possible to install the mounting portion 120 on which the powder storage container 150 is mounted on the fixing unit 151. The state in which the first guide pins 135 abut on the horizontal portions 145b of the sliding plates 143 and 144 corresponds to the installation completion position (the position P3 illustrated in FIG. 3C) which is the state (the installation position) in which the powder storage container 150 and the mounting portion 120 abut on the fixing unit 151.

As illustrated in FIGS. 3A and 3B, the storage chamber 152 of the present embodiment is formed such that the sectional area of the storage chamber 152 in the horizontal direction gradually decreases in size downward in the vertical direction. The powders which can be stored in the storage chamber 152 are not particularly limited in form, and, for example, may be pulverized amorphous matter, spherical synthetic particles, high aspect ratio rod-shaped matter, fiber-shaped matter, matter including a mixture thereof, and the like. The size is also not specified.

The storage chamber 152 includes a collar portion and is connected to the bottom of the fixing unit 151 at a portion of the collar portion. Therefore, a configuration is adopted in which the inlet 153 which is provided in the fixing unit 151 is provided above the storage chamber 152, the powder storage container 150 in which the powder is stored is installed corresponding to the inlet 153, and the powder is transferred (supplied) from the installed powder storage container 150 via the inlet 153 to the storage chamber 152 side by gravity. Although not illustrated, an outlet portion which feeds out the powder is provided on the bottom portion of the bottom of the storage chamber 152.

Next, a description will be given of the powder storage container (the cartridge) 150 which serves as a container for the sheet manufacturing apparatus 100 with reference to FIGS. 3A, 3B, 3C, 12, and 13. As illustrated in FIGS. 3A, 3B, and 3C, the powder storage container 150 which serves as a container for the sheet manufacturing apparatus 100 is provided with the container connecting unit 110 and the container portion 114 which is connected to the container connecting unit 110. The inside of the container portion 114 is a storage portion and the powder including the binding resin is stored inside the container portion 114. The container portion 114 is connected to the installation unit 200 via the container connecting unit 110 and supplies the powder to the storage chamber 152 via the installation unit 200. FIGS. 12 and 13 illustrate the external appearance of the powder storage container (the cartridge) 150 which serves as a container, FIG. 12 illustrates a perspective view from the front side, and FIG. 13 illustrates a perspective view from the rear side.

The container connecting unit 110 is provided with a first holder flange 111, the second shutter 112 which serves as the shutter of the powder storage container (the cartridge) 150, the second holder flange 113, the flat springs 116a and 116b which serve as the elastic portion and are disposed between the first holder flange 111 and the second holder flange 113, and a seal member 126 which is disposed on the bottom surface of the first holder flange 111.

An opening 115a which penetrates the obverse and the reverse (the top surface and the bottom surface) of the center portion is provided in the first holder flange 111. The flat springs 116a and 116b which serve as the elastic portion are fixed, one to each of both sides of the opening 115a of the center portion in the third direction. The through holes 127 are disposed on the inside (the first direction side) of the first holder flange 111 and the flat springs 116a and 116b are fixed to the first holder flange 111 by the fixing unit of the front side (the opposite side from the first direction) such that the side on which the through holes 127 are provided deforms in the second direction (upward) (refer to FIG. 7). The sides of the flat springs 116a and 116b on which the through holes 127 are provided are capable of elastically deforming in the second direction (upward), using the fixing unit as a fulcrum.

The band-shaped seal member 126 which surrounds the outer circumference of the opening 115a is provided on the reverse surface (the bottom surface of the opposite side from the second holder flange 113) of the first holder flange 111. The seal member 126 is formed of a resin or the like having elasticity, for example, and is capable of improving the adherence properties between the container connecting unit 110 to which the container portion 114 is connected and the mounting portion 120.

Although not illustrated in FIGS. 3A, 3B, and 3C, cutout portions in which portions of the corner portions are cut out are provided as escape portions for preventing interference with the stepped pins 148 at the corner portions on both sides in the third direction of the end portion of the inside in the first direction of the first holder flange 111. A detailed description will be given later of the cutout portions.

An opening 115b which is disposed above the first holder flange 111 and penetrates the obverse and the reverse (the top surface and the bottom surface) of the center portion is provided in the second holder flange 113. The opening 115b is disposed at a position which substantially overlaps the opening 115a of the first holder flange 111 and, together with the opening 115a, allows the powder to pass therethrough which the second shutter 112 is opened. Flat spring escape grooves 156a and 156b which store the flat springs 116a and 116b and with which the deformation of the flat springs 116a and 116b becomes possible are provided in the second holder flange 113 in the surface of the side facing the first holder flange 111. Incidentally, the flat springs 116a and 116b are disposed on the first holder flange 111 so as to be stored inside the flat spring escape grooves 156a and 156b.

The flange convex portion 113a which serves as a convex portion which protrudes from the obverse surface (the top surface) of the second holder flange 113 is provided on the two corner portions of both sides of the end portion of the second holder flange 113 which is positioned in the opposite direction from the direction (the first direction) from the installation start position (the position P1 illustrated in FIG. 3C) toward the intermediate position (the position P2 illustrated in FIG. 3C) when the powder storage container 150 is mounted on the mounting portion 120. The flange convex portion 113a which serves as a convex portion is capable of demarcating the mounting direction when the powder storage container 150 is mounted.

Specifically, in a case in which the powder storage container 150 is mounted in a reverse orientation, the flange convex portion 113a interferes with the end wall portion 128 which is provided on the mounting guide portion 122 of the mounting portion 120 and it is not possible to move the powder storage container 150 from the installation start position (the position P1 illustrated in FIG. 3C) to the intermediate position (the position P2 illustrated in FIG. 3C). Meanwhile, since a similar protrusion to that of the flange convex portion 113a is not provided on the end portion which is positioned in the direction (the first direction) heading from the installation start position (the position P1 illustrated in FIG. 3C) toward the intermediate position (the position P2 illustrated in FIG. 3C), it is possible to move the powder storage container 150 from the installation start position (the position P1 illustrated in FIG. 3C) to the intermediate position (the position P2 illustrated in FIG. 3C).

The flange convex portion 113a which serves as a convex portion may be provided on at least one corner of the end portion side of the second holder flange 113 which is positioned at the opposite direction side with respect to the direction (the first direction) heading from the installation start position (the position P1 illustrated in FIG. 3C) toward the intermediate position (the position P2 illustrated in FIG. 3C), and it is possible to achieve a similar function. In this case, when the powder storage container 150 is mounted in a reverse orientation, the end wall portion 128 which is provided on the mounting guide portion 122 of the mounting portion 120 is provided on the mounting guide portion 122 of the side which interferes with the flange convex portion 113a. Although not illustrated in FIGS. 3A, 3B, and 3C, through holes for preventing interference with the stepped pins 148 are provided at the corner portions (the positions facing the cutout portions of the first holder flange 111) on both sides in the third direction of the end portion of the inside in the first direction of the second holder flange 113.

The second shutter 112 which serves as the shutter of the powder storage container (the cartridge) 150 opens and closes the opening 115*a* of the first holder flange 111 and the opening 115*b* of the second holder flange 113. The second shutter 112 is capable of performing the opening and closing by sliding inside the groove which is configured to be present between the first holder flange 111 and the second holder flange 113. When the powder storage container 150 is at the installation completion position (the position P3 illustrated in FIG. 3C), the second shutter 112 is locked by the locking mechanism such that it is possible to operate the second shutter 112. The second shutter 112 which is locked is unlocked by the unlocking mechanism and it becomes possible to operate the second shutter 112.

The locking mechanism is a mechanism for engaging with the second shutter 112 and locking the second shutter 112 at the closed position which covers the openings 115*a* and 115*b*. The unlocking mechanism is a mechanism which unlocks the second shutter 112 which is provided on the powder storage container 150 when the powder storage container 150 is at the installation completion position (the position P3 illustrated in FIG. 3C), enabling an opening operation.

The locking mechanism includes the flat springs 116*a* and 116*b* (refer to FIGS. 3B and 7) which serve as the elastic portion. As illustrated in FIGS. 3B and 7, the flat springs 116*a* and 116*b* are disposed on the end portions of both sides in the previously-described third direction of the first holder flange 111 and are provided in a band shape to run parallel along the first direction.

Here, a detailed description will be given of the locking mechanism and the unlocking mechanism of the second shutter 112 with reference to FIGS. 14A and 14B.

As illustrated in FIGS. 14A and 14B, the locking mechanism includes the flat springs 116*a* and 116*b* (refer to FIGS. 3B and 7) which serve as the elastic portion and are disposed on the container connecting unit 110, spring convex portions 123 which are provided on the flat springs 116*a* and 116*b*, and shutter recessed portions 124 which are provided in the second shutter 112. The unlocking mechanism includes the mounting portion 120 and the stepped pins 148 which are provided on the fourth plate portion 134 (the first shutter 130). Since the flat springs 116*a* and 116*b* have a similar configuration and similar operations are performed, in the following description, the description will be given using one of the flat springs 116*b*.

First, a description will be given of the workings by which the second shutter 112 is locked by the locking mechanism. FIG. 14A illustrates the locked state of the second shutter 112 by the flat spring 116*b*. As illustrated in FIG. 14A, the spring convex portion 123 which protrudes toward the second shutter 112, which is disposed adjacent to the flat spring 116*b*, is provided on the flat spring 116*b*. The shutter recessed portion 124 which is recessed to store the spring convex portion 123 is provided in the second shutter 112 facing the spring convex portion 123. During the time until the powder storage container 150 (the container connecting unit 110) reaches the installation completion position (the position P3 illustrated in FIG. 3C), the flat spring 116*b* assumes a state of abutting on the first holder flange 111 and the spring convex portion 123 is stored in the shutter recessed portion 124 to configure the engaged state in which the spring convex portion 123 is engaged with the shutter recessed portion 124. According to this engaged state, the second shutter 112 is engaged (locked) with the first holder flange 111 via the flat spring 116*b* and assumes a state of being unable to operate (slide) until being unlocked.

Next, a description will be given of the workings by which the second shutter 112 is unlocked by the unlocking mechanism. The unlocking mechanism is a mechanism which unlocks the second shutter 112 which is provided on the powder storage container 150 when the powder storage container 150 is at the installation completion position (the position P3 illustrated in FIG. 3C). In a case in which the powder storage container 150 reaches the installation completion position (the position P3 illustrated in FIG. 3C), it is possible to open the second shutter 112. When the second shutter 112 is unintentionally opened at another position, there is a concern that the powder will be scattered, which is unfavorable.

FIG. 14B illustrates a state in which the second shutter 112 is unlocked by the flat spring 116*b*. As illustrated in FIG. 14B, when the powder storage container 150 moves from the intermediate position (the position P2 illustrated in FIG. 3C) to the installation completion position (the position P3 illustrated in FIG. 3C) and the mounting portion 120 starts lowering, the stepped pin 148 moves upward relative to the flat spring 116*b* and a narrow diameter portion 148*a* of the stepped pin 148 is inserted into the through hole 127 which is provided in the flat spring 116*b*.

Subsequently, when the powder storage container 150 further moves toward the installation completion position (the position P3 illustrated in FIG. 3C) and the mounting portion 120 is lowered, a step portion 148*c* (refer to FIG. 15B) of a large diameter portion 148*b* of the stepped pin 148 which moves further relatively upward abuts on the flat spring 116*b*, pushes the flat spring 116*b* upward and causes the flat spring 116*b* to deform.

The spring convex portion 123 which is provided on the flat spring 116*b* also moves upward in accordance with the deformation of the flat spring 116*b*, the engagement with the shutter recessed portion 124 of the second shutter 112 is released, and the locking by the flat spring 116*b* is released. Accordingly, the first holder flange 111 is unlocked via the flat spring 116*b* and the second shutter 112 is capable of performing an opening operation. The diameter of the through hole 127 which is provided in the flat spring 116*b* is configured to be larger than the diameter of the narrow diameter portion 148*a* of the stepped pin 148 and smaller than the diameter of the large diameter portion 148*b* of the stepped pin 148.

The container portion 114 is a storage portion in which the powder is stored. As illustrated in FIGS. 12 and 13, a container flange 159 including ribs 158 which stick out in four directions is provided on the opening side of the container portion 114. The container portion 114 is connected to the top of the container connecting unit 110 in the container flange 159. The ribs 158 include a function of a reinforcement material for improving the strength of the container portion 114. The container portion 114 is formed such that the sectional area of the container portion 114 in the horizontal direction gradually increases in size upward in the vertical direction. For the container portion 114 in the present embodiment, a configuration is used in which a part 114*a* having a comparatively small sectional area in the horizontal direction is provided on the bottom side in the vertical direction, that is, the side to which the container connecting unit 110 is connected, and a part 114*b* having a comparatively large sectional area is provided on the top side in the vertical direction. In the present embodiment, a connecting part 114c between the part 114a having a comparatively small sectional area and the part 114b having a comparatively large sectional area is formed to gradually increase in size upward in the vertical direction. By adopting such an embodiment, the powder is transferred (supplied) to the storage chamber 152 side via the inlet 153 by gravity. In the present embodiment, although an example is given in which the sectional shape is quadrilateral, the sectional shape is not limited to being quadrilateral, and, for example, may be another shape such as circular, elliptical, or polygonal.

Next, a description will be given of the cutout portions of the first holder flange 111 which relates to the through holes 127 of the flat springs 116a and 116b, the stepped pins 148 which serve as the first engaging portions, and the first holder flange 111 with reference to FIGS. 15A and 15B. The cutout portions are provided for preventing interference with the stepped pins 148 which are inserted into the through holes 127 of the flat springs 116a and 116b. Therefore, the cutout portions are present at the parts facing the through holes 127 of the flat springs 116a and 116b and are provided to have a width capable of storing at least the large diameter portions 148b the stepped pins 148.

Specifically, the cutout portions are provided on the corner portions of both sides in the third direction of the end portion which is positioned on the inside in the first direction of the first holder flange 111 and are configured to include two cutout wall portions 117 and 118. When the first shutter 130 is in a closed state, that is, when the powder storage container 150 which includes the container connecting unit 110 is mounted on the mounting portion 120 at the position P1 (refer to FIG. 3C) which is the installation start position, the cutout portions are positioned closer to the outside than the external shape of the large diameter portions 148b of the stepped pins 148 which are provided on the first shutter 130. The through holes 127 of the flat springs 116a and 116b are positioned between the second holder flange 113 of the top portions of the cutout portions and the narrow diameter portions 148a of the stepped pins 148 are inserted into the through holes 127, and thus, it is possible to perform the opening and closing of the first shutter 130. By pushing the step portions 148c of the stepped pins 148 against the through holes 127, it is possible to cause the flat springs 116a and 116b to elastically deform in the up-down direction.

It is possible to adopt a configuration such as the one of the modification example illustrated in FIG. 15C for the cutout portions. The cutout portion according to the modification example has wall portions in three directions, two cutout wall portions 117a and 118a and an end pressure portion 119 which is provided at a position facing one cutout wall portion 118a and has a narrow long shape, and the cutout wall portion is configured to be open in one direction. The end pressure portion 119 is formed in a narrow long shape having a guide surface 119a and a protrusion portion 119b to be capable of elastic deformation. In the cutout portion of the present modification example, the large diameter portion 148b of the stepped pin 148 is interposed by the two cutout wall portions 117a and 118a and the protrusion portion 119b of the deformable end pressure portion 119 and it is possible to perform positioning between the first holder flange 111 and the stepped pin 148.

According to the present embodiment described above, it is possible to obtain the following effects.

(1) According to the sheet manufacturing apparatus 100 according to the present embodiment, the sheet manufacturing apparatus 100 includes the first shutter 130 which is capable of moving between an open position at which the inlet 153 is opened and a closed position at which the inlet 153 is closed in accordance with the attachment and the detachment of the powder storage container 150 (the cartridge), which serves as a container, with respect to the installation unit 200. The first shutter 130 is provided with the first plate portion 131, the second plate portion 132, the third plate portion 133, and the fourth plate portion 134 which serve as the plurality of shutter members, and at the open position, the first plate portion 131, the second plate portion 132, the third plate portion 133, and the fourth plate portion 134 are stored overlapping one another. Accordingly, it is possible to reduce the space for storing the first shutter 130 to a small space and it is possible to obtain a reduction in the size of the sheet manufacturing apparatus 100.

(2) According to the shutter movement mechanism which is provided in the installation unit 200 and includes the stepped pins 148 which serve as the first engaging portion, the through holes 127, which serve as the second engaging portion, which are provided in the flat springs 116a and 116b which serve as the elastic portion and are disposed on the container connecting unit 110, and the like, it is possible to perform opening and closing of the first shutter 130 and storage operations in accordance with the installation of the powder storage container 150 (the movement of the container).

(3) According to the engagement of the stepped pins 148 which serve as the first engaging portion and are provided on the first shutter 130 and the through holes 127 (the flat springs 116a and 116b) which serve as the second engaging portion and are provided in the powder storage container 150 which serves as the container, it is possible to perform the opening and closing of the first shutter 130 in accordance with the installation and the movement of the powder storage container 150.

(4) It is possible to mount the powder storage container 150 which serves as the container on the mounting portion 120 in a state in which the powder storage container 150 is moved in the second direction (upward) which intersects the first direction (the installation direction from the front side to the inside) and to mount the powder storage container 150 by moving the powder storage container 150. Accordingly, it is possible to perform the installation of the powder storage container 150 by moving the powder storage container 150 at a position distanced from the installation unit 200 and subsequently moving the powder storage container 150 downward, and it is possible to reliably mount the powder storage container 150 to the installation unit 200 and perform the installation. It is possible to improve the sealing properties (the adherence properties) between the powder storage container 150 and the installation unit 200.

(5) When the powder storage container 150 which serves as the container is not at the intermediate position (the position P2 illustrated in FIG. 3C), in other words, when at least the powder storage container 150 is at the installation start position (the position P1 illustrated in FIG. 3C), since the lever portion (the gripping portion) 142 is below the powder storage container 150, the manipulation of the lever portion (the gripping portion) 142 becomes difficult and it is not easy to perform the manipulation, and thus, it is possible to prevent erroneous manipulation.

(6) Since it is possible to support the powder storage container 150 at the installation start position (the position P1 illustrated in FIG. 3C) using the lever support portion 142a which is provided on the lever portion (the gripping portion) 142, it is possible to prevent the inclination and falling over of the powder storage container 150 when mounting the powder storage container 150 on the mounting portion 120. In a state in which the powder storage container 150 is supported (mounted) on the lever support portion 142a, since it is not possible to perform an operation of pushing in the lever portion (the gripping portion) 142, it is not possible to move the mounting portion 120 in the second direction (downward) at the installation start position (the position P1 illustrated in FIG. 3C). Accordingly, it is possible to inhibit erroneous manipulation with respect to the movement in the second direction (downward).

(7) It is possible to inhibit the installation of the powder storage container 150 with the front-rear orientation being in reverse orientation, that is, it is possible to inhibit erroneous installation due to the flange convex portion 113a which serves as the convex portion and is provided on the front side in the installation direction of the second holder flange 113 which configures the powder storage container 150 interfering with (abutting on) the end wall portion 128 which is provided on the front end side of the mounting guide portion 122.

(8) According to the locking mechanism which stops (engages) the operation of the second shutter 112, since it is not possible to open the second shutter 112 which is provided on the container connecting unit 110 of the powder storage container 150 until the installation of the powder storage container 150 is completed (until the installation completion position (the position P3 illustrated in FIG. 3C)), it is possible to prevent the scattering of the powder caused by erroneous manipulation or the like.

(9) Since flat springs 116a and 116b which serve as the elastic portion are deformed by the stepped pins 148 to unlock the second shutter 112 when the powder storage container 150 is moved from the intermediate position (the position P2 illustrated in FIG. 3C) to the installation completion position (the position P3 illustrated in FIG. 3C), it is possible to perform the unlocking at approximately the same time as the installation of the powder storage container 150 is completed. Therefore, it is possible to perform the opening of the second shutter 112 without delay after the powder storage container 150 is installed at the installation completion position (the position P3 illustrated in FIG. 3C).

(10) According to the powder storage container (the cartridge) 150 for the sheet manufacturing apparatus 100 according to the present embodiment, the powder storage container (the cartridge) 150 is installed on the installation unit 200 in a state in which the locking mechanism locks the shutter (the second shutter 112) at the closed position at which the openings 115a and 115b are covered. When installing the installation unit 200, the engagement (the locking) of the shutter by the engaging portion which is configured by the spring convex portions 123 and the shutter recessed portions 124 is released due to the flat springs 116a and 116b which serve as the elastic portion being deformed by the stepped pins 148 which are provided on the installation unit 200. Accordingly, it is possible to prevent the shutter (the second shutter 112) from being unintentionally opened before the installation or during the installation of the powder storage container (the cartridge) 150, and it is possible to prevent the scattering of the powder caused by erroneous manipulation or the like.

(Second Embodiment)

Next, a description will be given of the second embodiment of the invention.

First, a description will be given of the configuration of the powder supply device of the present embodiment. The powder supply device is a device which is provided with a storage chamber, a powder storage container, and a stopping portion. The storage chamber is a storage chamber in which the powder is stored and which includes an inlet for pouring the powder and an outlet portion for supplying the powder. The powder storage container is a powder storage container which stores the powder and includes an opening for transferring the powder from the inlet to the outlet portion and an opening and closing unit for opening and closing the opening. When the opening is opened and the storage chamber is communicated with the powder storage container, the powder which is stored in the powder storage container is poured into the storage chamber due to gravity. The stopping portion is for stopping the atmosphere communicating path which is formed when the opening is opened and the storage chamber is communicated with the powder storage container and which communicates the storage chamber, the powder storage container, or both with the outside. Hereinafter, a description will be given of the specific configuration.

Figure 18:
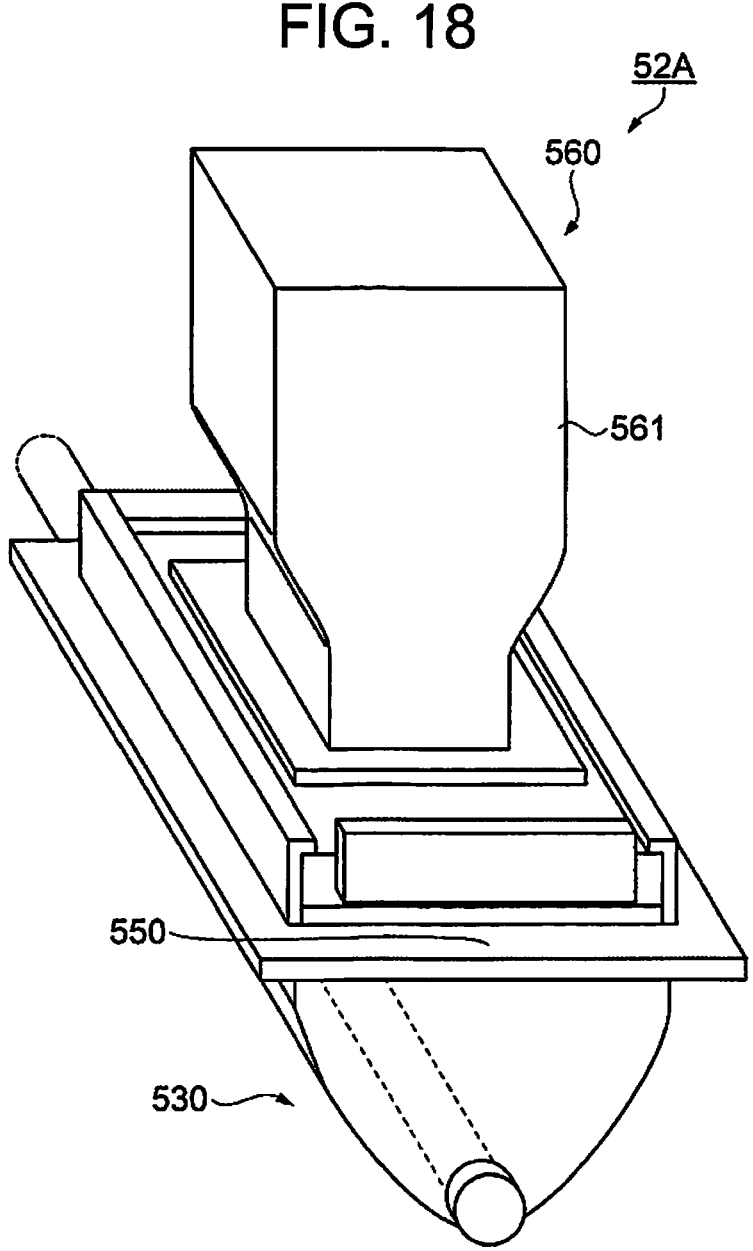
FIG. 18 is a schematic external appearance view illustrating the configuration of the powder supply device.
Figure 19:
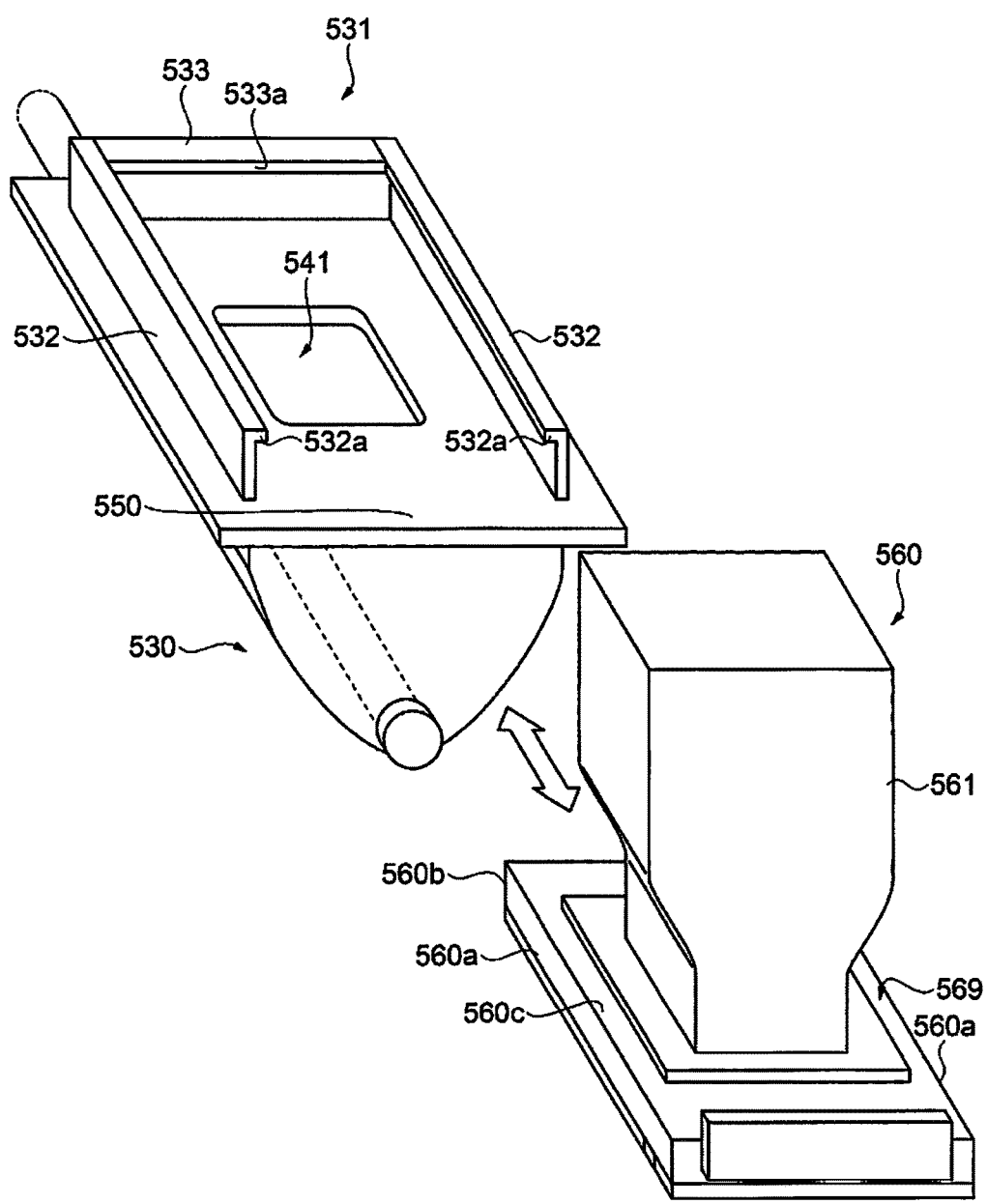
FIG. 19 is a schematic external appearance view illustrating the configuration of the powder supply device.
Figure 20:
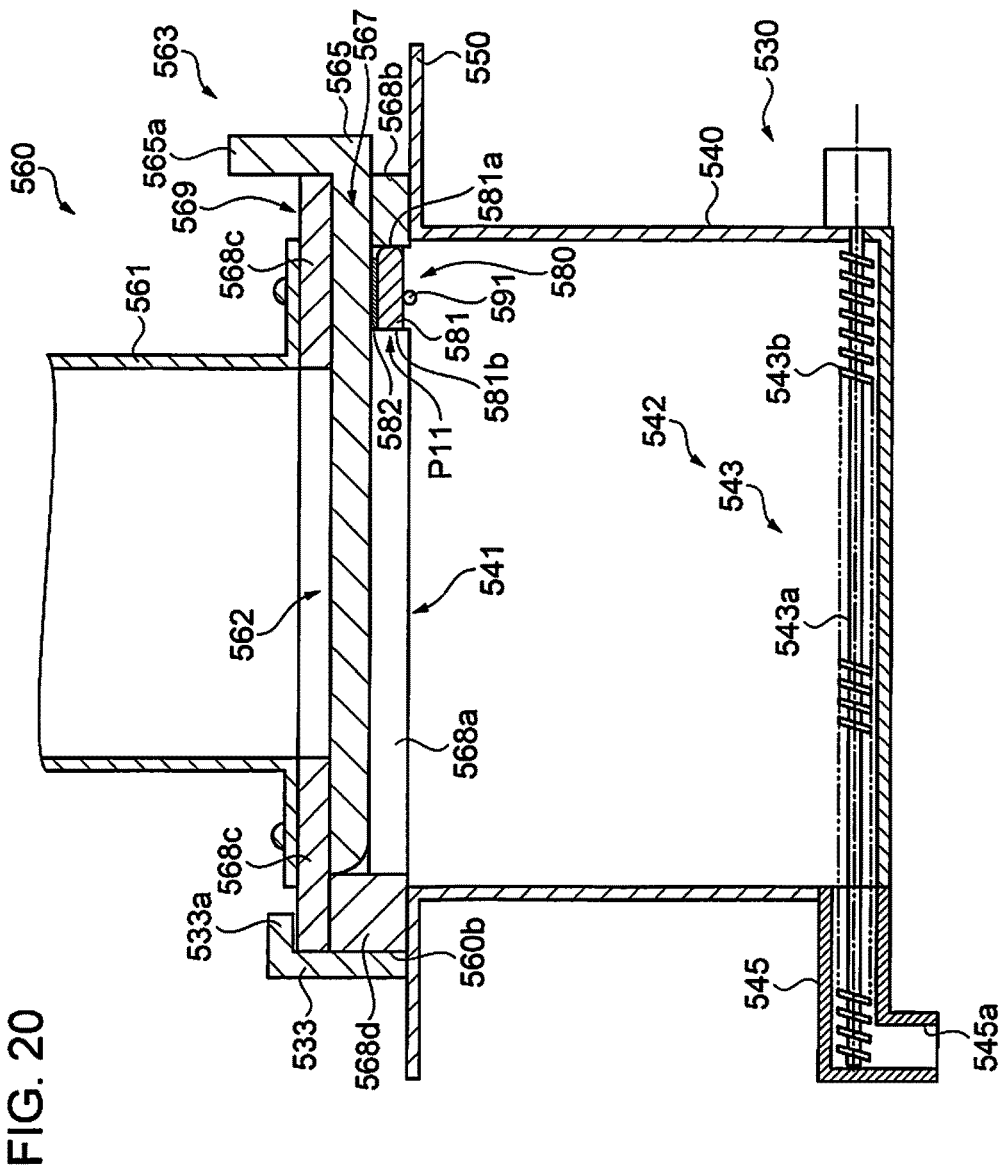
FIG. 20 is a lateral sectional diagram illustrating the configuration of the powder supply device.
Figure 21:
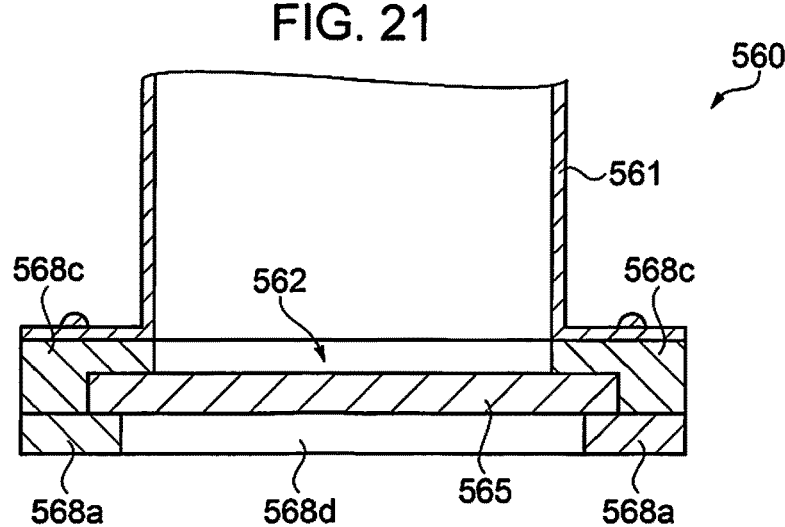
FIG. 21 is a front sectional diagram illustrating the configuration of the powder storage container.
Figure 22:
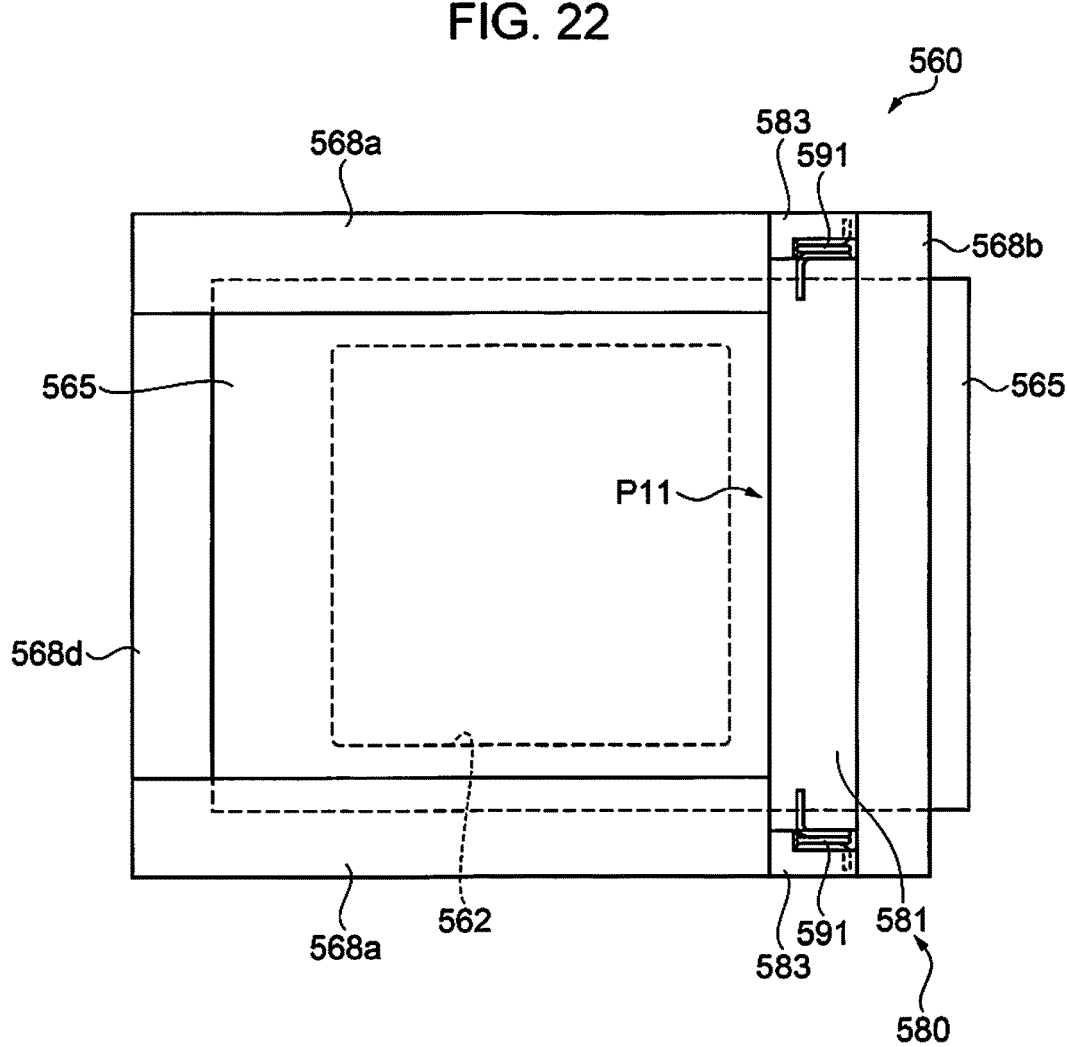
FIG. 22 is an underside plan view illustrating the configuration of the powder storage container.

FIGS. 18 and 19 are schematic external appearance views illustrating the configuration of the powder supply device, FIG. 20 is a lateral sectional diagram illustrating the configuration of the powder supply device, FIG. 21 is a front sectional diagram illustrating the configuration of the powder storage container, and FIG. 22 is an underside plan view illustrating the configuration of the powder storage container.

As illustrated in FIGS. 18 and 19, a powder supply device 52A is provided with a storage chamber 530 and a powder storage container 560. In the powder supply device 52A of the present embodiment, the powder storage container 560 is configured to be attachable and detachable with respect to the storage chamber 530.

Specifically, a guide portion 531 is provided above the storage chamber 530. The guide portion 531 includes side surface guide portions 532 and an end surface guide portion 533. Side surface portions 560a of both sides of the powder storage container 560 are aligned with the side surface guide portions 532 of the guide portion 531, caused to slide, and pushed in until an end surface portion 560b of the powder storage container 560 comes into contact with the end surface guide portion 533. Accordingly, the positions of the storage chamber 530 and the powder storage container 560 are aligned.

Protrusion portions 532a and 533a are formed on the tops of the side surface guide portions 532 and the end surface guide portion 533 of the guide portion 531 and the surfaces of the protrusion portions 532a and 533a come into contact with a top surface 560c of the powder storage container. Accordingly, the powder storage container 560 is fixed to the storage chamber 530.

In a case in which the powder storage container 560 is removed from the storage chamber 530, it is possible to perform the removal by causing the side surface portions 560a of both sides of the powder storage container 560 to slide along the side surface guide portions 532 of the guide portion 531 in the reverse direction from the installation direction.

As illustrated in FIG. 20, the storage chamber 530 is provided with a storage box 540 which stores the powder, an inlet 541 for pouring the powder into the storage box 540, and an outlet portion 542 for supplying the powder.

The storage box 540 of the present embodiment is formed such that the sectional area of the storage box 540 in the horizontal direction gradually becomes smaller downward in the vertical direction (refer to FIG. 19). The powders which can be stored in the storage box 540 are not particularly limited in form, and, for example, may be pulverized amorphous matter, spherical synthetic particles, high aspect ratio rod-shaped matter, fiber-shaped matter, matter including a mixture thereof, and the like. The size is also not specified.

A configuration is adopted in which the inlet 541 is provided above the storage box 540, the powder storage container 560 in which the powder is stored is installed corresponding to the inlet 541, and the powder is transferred (poured) from the installed powder storage container 560 via the inlet 541 to the storage box 540 side by gravity. A second collar portion 550 is provided on the circumference of the inlet 541.

The outlet portion 542 is provided on the bottom portion under the storage box 540. The outlet portion 542 of the present embodiment is provided with a screw 543. The screw 543 is provided with a rotating shaft 543a which extends from the inner portion of the storage box 540 to the outside of the storage box 540 and a spiral-shaped blade portion 543b which is provided on the outer surface of the rotating shaft 543a. A motor (not illustrated) is connected to one end of the rotating shaft 543a and the blade portion 543b rotates due to the motor being driven. A transport path 545 is provided on the other end side of the rotating shaft 543a.

The transport path 545 is formed in a tube shape and extends toward the outside from the storage box 540. The screw 543 is disposed inside the transport path 545. As illustrated in FIG. 20, a portion of the screw 543 is disposed inside the transport path 545 and another portion of the screw 543 is disposed in a state of being exposed to the bottom portion inside the storage box 540. By driving the motor, the screw 543 is rotationally driven and the powder inside the storage box 540 is transported. Specifically, the powder inside the storage box 540 is transported along the transport path 545 by the blade portion 543b and is supplied (discharged) from a supply port 545a which is provided in the transport path 545. A configuration may be adopted in which an agitator for stirring the powder inside the storage box 540 of the storage chamber 530 is provided.

As illustrated in FIGS. 20, 21, and 22, the powder storage container 560 is provided with a container portion (a storage portion, a pooling portion) 561 which stores the powder, an opening 562, and an opening and closing unit 563 for opening and closing the opening 562. The opening and closing unit 563 is provided with a first shutter 565. The first shutter 565 is provided to be attachable and detachable with respect to the powder storage container 560. The first shutter 565 has a flat shape. The opening and closing unit 563 is provided with a pair of guide portions 568a which guide the movement for the attachment and the detachment of the first shutter 565, a guide portion 568b, a pair of guide portions 568c, and a guide portion 568d. The pair of guide portions 568a and the pair of guide portions 568c are disposed such that the guide portions of each pair face one another and interpose the opening 562.

The guide portions 568a and 568b guide the reverse surface of the first shutter 565 and the guide portion 568c guides the side surfaces and the top surface of the first shutter 565. The guide portion 568d abuts on one end surface of the first shutter 565 during the installation of the first shutter 565 and restricts the position (the closed position) of the first shutter 565. An attachment and detachment port 567 for attaching and detaching the first shutter 565 is formed by the guide portion 568b and the guide portion 568c. The first shutter 565 is inserted from the attachment and detachment port 567 and it is possible to move the first shutter 565 along the guide portions 568a, 568b, and 568c. It is possible to close the opening 562 when the first shutter 565 is inserted to a position at which the end portion of the insertion direction side of the first shutter 565 abuts on the guide portion 568d. It is possible to open the opening 562 by moving the first shutter 565 in the reverse direction (the removal direction).

An elastic member such as a film body or a sponge may be provided at the portions corresponding to the guide portions 568a, 568b, and 568c of the first shutter 565. By adopting such a configuration, the air-tightness between the guide portions 568a, 568b, and 568c and the first shutter 565 is increased, it is possible to prevent the scattering of the powder inside the container portion 561 to the outside, and it is possible to increase the sliding properties of the first shutter 565 with respect to the guide portions 568a, 568b, and 568c.

A protrusion portion 565a heading upward is provided on the end portion of the removal direction side of the first shutter 565. For example, the protrusion portion 565a serves as a gripping portion when installing the first shutter 565 on the powder storage container 560 and removing the first shutter 565 from the powder storage container 560. A first collar portion 569 is provided on the circumference of the opening 562. In the present embodiment, it is also possible to adopt a configuration in which the guide portions 568a to 568d and the opening 562 are provided on the first collar portion 569.

Next, a description will be given of the pouring method of the powder from the powder storage container 560 into the storage chamber 530. First, the powder storage container 560 is installed on the storage chamber 530. Specifically, the powder storage container 560 is moved while aligning the guide portion 531 which is provided on the second collar portion 550 of the storage chamber 530 and the end surface portion 560b of the first collar portion 569 of the powder storage container 560 and the end surface portion 560b of the powder storage container 560 is pushed in until the end surface portion 560b comes into contact with the end surface guide portion 533. Accordingly, the powder storage container 560 is installed on the storage chamber 530. At this time, a state is assumed in which the first collar portion 569 and the second collar portion 550 abut on one another.

Next, the first shutter 565 is removed from the powder storage container 560. Specifically, the first shutter 565 is gradually moved outward (the direction in which the protrusion portion 565a separates from the attachment and detachment port 567) along the guide portions 568a, 568b, and 568c, and finally, the first shutter 565 is pulled out from the attachment and detachment port 567. Accordingly, the opening 562 of the powder storage container 560 is fully opened and communicates with the inlet 541 of the storage chamber 530. The powder which is stored in the powder storage container 560 is poured into the storage chamber 530 due to gravity. In a configuration in which the powder remains inside the powder supply device 52 without completely removing the first shutter 565, for example, a space which supports the first shutter 565 becomes necessary, which is a hindrance to reducing the size of the device, and in a case in which a plurality of the powder supply devices 52 are lined up, this may impede the attachment and the detachment of the adjacent powder storage containers 560. Therefore, in the present embodiment, a configuration is adopted in which the first shutter 565 may be removed from the powder storage container 560.

Figure 23:
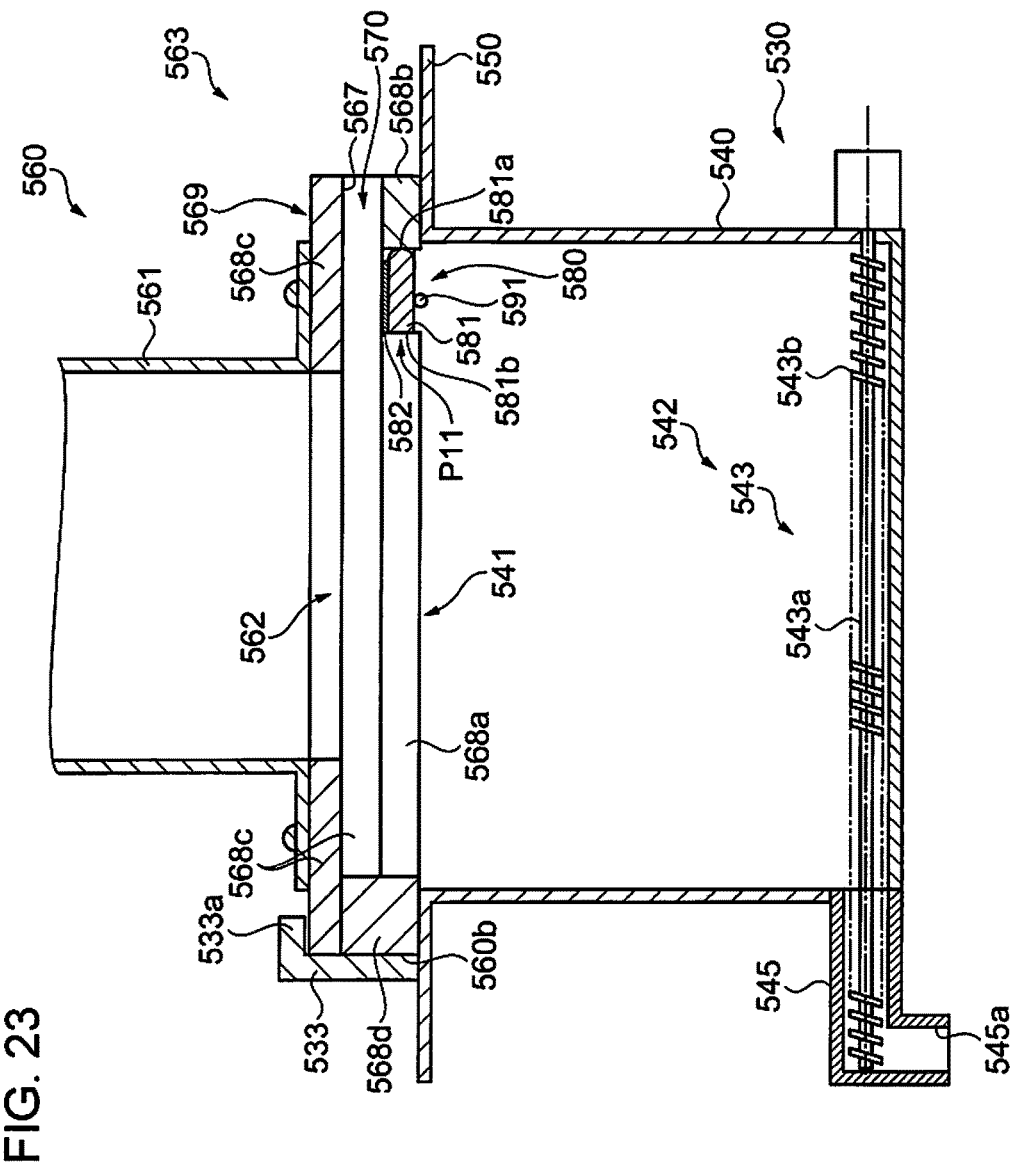
FIG. 23 is a lateral sectional diagram illustrating the configuration of an atmosphere communicating path.
Figure 24:
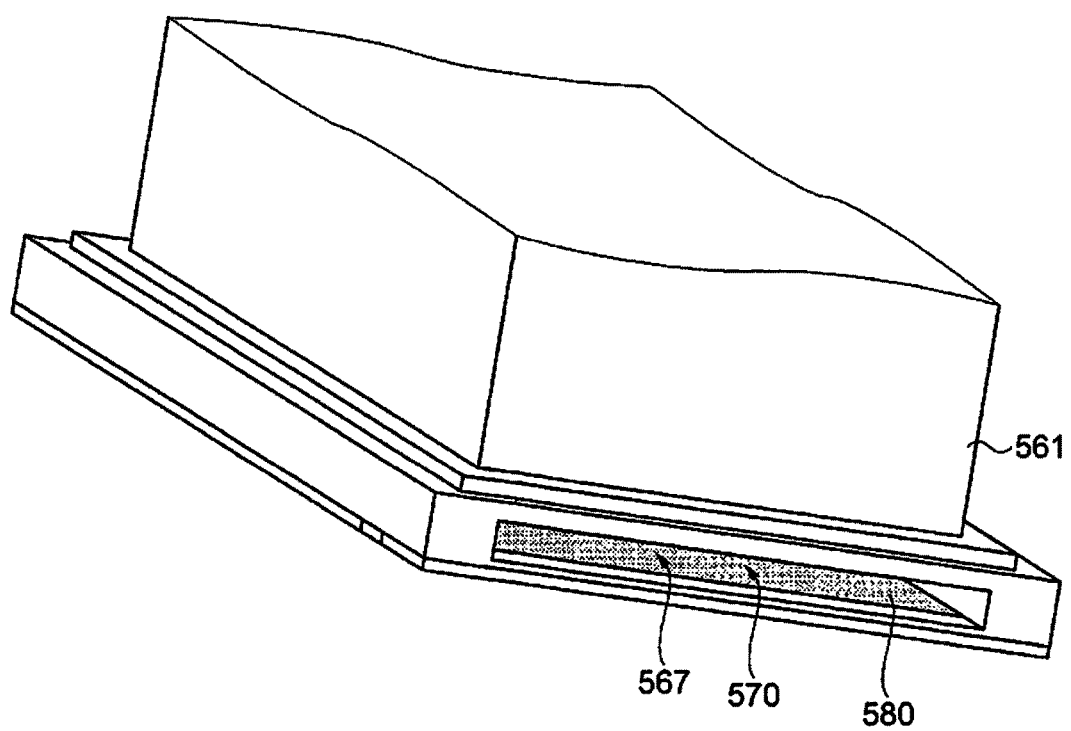
FIG. 24 is a perspective view illustrating the configuration of the atmosphere communicating path.

Here, FIG. 23 is a lateral sectional diagram illustrating the configuration of an atmosphere communicating path and FIG. 24 is a perspective view illustrating the configuration of the atmosphere communicating path. As illustrated in FIGS. 23 and 24, an atmosphere communicating path 570 which communicates the storage chamber 530, the powder storage container 560, or both with the outside when the opening 562 of the powder storage container 560 is opened and the storage chamber 530 and the powder storage container 560 are communicated.

In the present embodiment, in a case in which viewing is performed from the powder storage container 560 side, the atmosphere communicating path 570 which communicates from the opening 562 of the powder storage container 560 to the outside via the attachment and detachment port 567 is formed. In a case in which viewing is performed from the storage chamber 530 side, the atmosphere communicating path 570 which communicates from the inlet 541 of the storage chamber 530 to the outside via the attachment and detachment port 567 of the powder storage container 560 is formed.

In this manner, in the present embodiment, the regions (the storage box 540 and the container portion 561) of each of the storage chamber 530 and the powder storage container 560 in which the powder is stored is communicated with the atmosphere through the atmosphere communicating path 570 (the space which is formed when the first shutter 565 is removed). The attachment and detachment port 567 configures a portion of the atmosphere communicating path 570.

When the powder storage container 560 is removed from the first shutter 565, a space (a communicating path) corresponding to the size of the first shutter 565 is formed from the attachment and detachment port 567 to the opening 562 in the powder storage container 560. When the powder is poured from the powder storage container 560 into the storage chamber 530 in this state, the powder is scattered from the powder supply device 52A via the atmosphere communicating path 570. Therefore, in the present embodiment, a stopping portion 580 for stopping the atmosphere communicating path 570 is provided. The stopping portion 580 of the present embodiment is provided on the first collar portion 569 of the powder storage container 560. Hereinafter, a description will be given of the specific configuration.

The stopping portion 580 of the present embodiment is provided with a second shutter 581. When the first shutter 565 is removed from the powder storage container 560, the second shutter 581 covers the atmosphere communicating path 570 (a portion of the space in which the first shutter 565 is present until this time) between the attachment and detachment port 567 and the opening 562.

As illustrated in FIGS. 20 and 22, the second shutter 581 has a flat shape and is rectangular in plan view (refer to FIG. 22) in which the powder storage container 560 is viewed from the bottom surface side. The length of the long sides of the second shutter 581 in plan view is formed to be longer than the width of the atmosphere communicating path 570. Specifically, longer than the distance between the guide portions 568a which are disposed to face one another interposing the opening 562 and the width of the attachment and detachment port 567 (the first shutter 565).

The second shutter 581 is supported by fixing members 583, which are provided on the first collar portion 569, to be capable of rocking. For example, the second shutter 581 is configured to be capable of rocking by providing protruding portions on both short side portions of the second shutter 581 and providing a groove portion (a hole portion) which supports the protruding portions on the fixing members 583. The second shutter 581 is disposed between the attachment and detachment port 567 and the opening 562 (for example, between the guide portions 568a and the guide portion 568b). Since the space between the attachment and detachment port 567 and the opening 562 becomes a portion of the atmosphere communicating path 570, it is possible to stop the atmosphere communicating path 570 by providing the second shutter 581 in this position. In the present embodiment, in lateral sectional view, the second shutter 581 is disposed under (on the bottom surface side of) the first shutter 565 (refer to FIG. 20).

The stopping portion 580 is provided with spring members 591 which serve as a biasing member which biases the second shutter 581 to the first shutter 565 side. The second shutter 581 is configured such that it is possible to position (displace) the second shutter 581 at a first position P11 (refer to FIG. 20) and a second position P12 (refer to FIG. 26) using the biasing force of the spring member 591. Specifically, two torsion coil springs are used as the spring members 591, one end portion of the torsion coil spring is attached to a locking portion which is provided on each of both short side portions of the second shutter 581, and the other end of the torsion coil spring is attached to the locking portion which is provided on the fixing member 583. The second shutter 581 is biased to the first shutter 565 side by the spring members 591.

Figure 25:
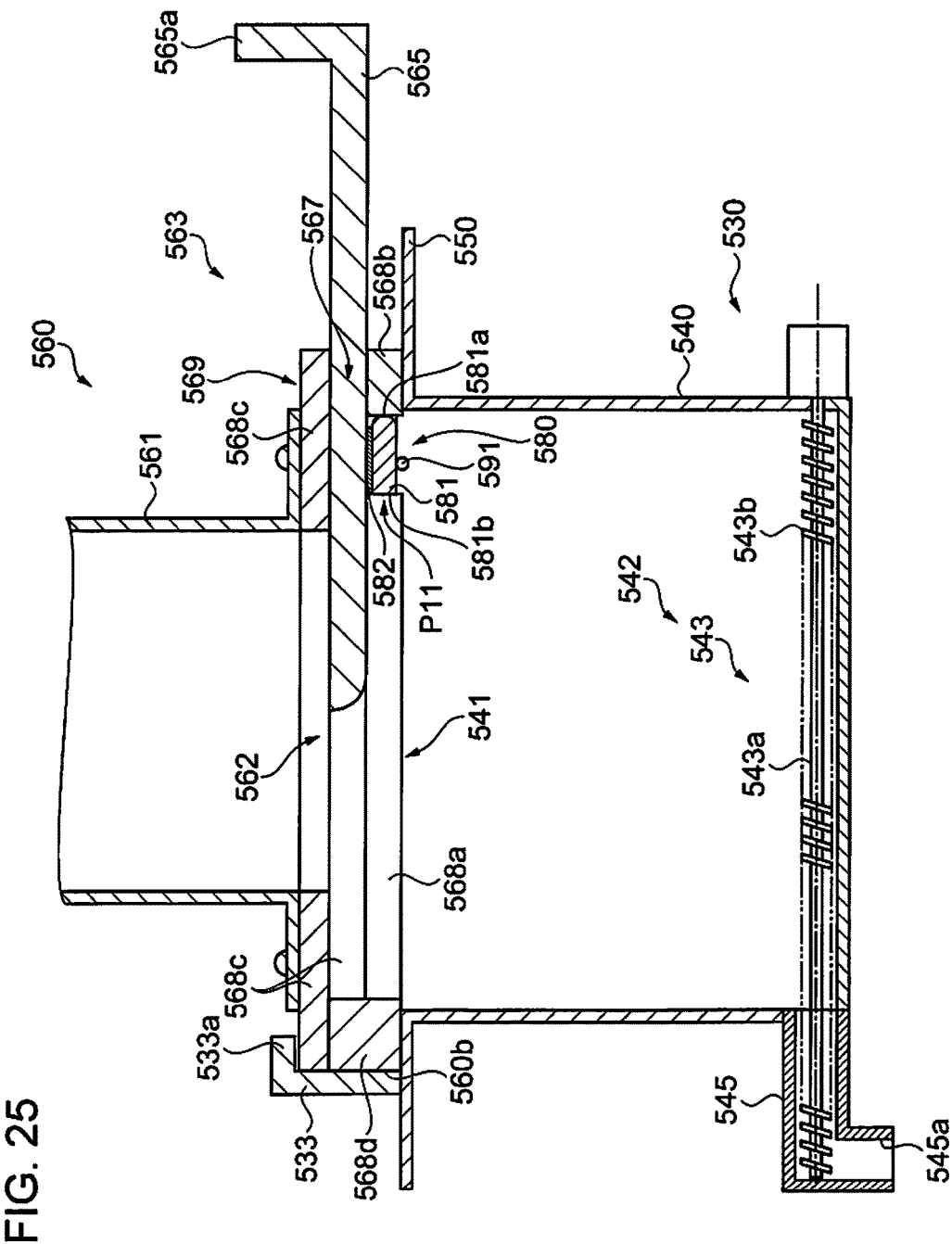
FIG. 25 is a lateral sectional diagram illustrating the operation of a stopping portion.
Figure 26:
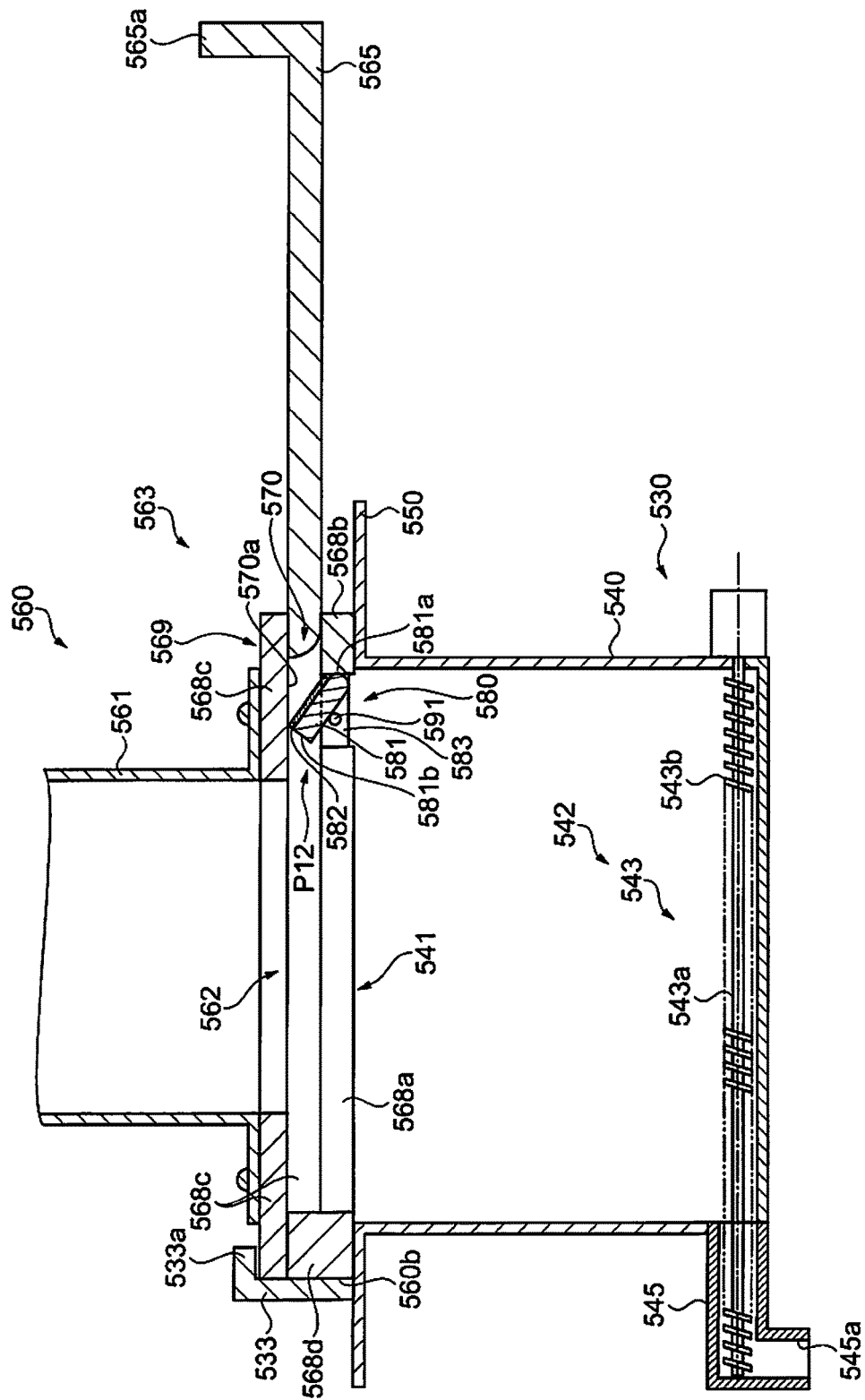
FIG. 26 is a lateral sectional diagram illustrating the operation of the stopping portion.
Figure 27:
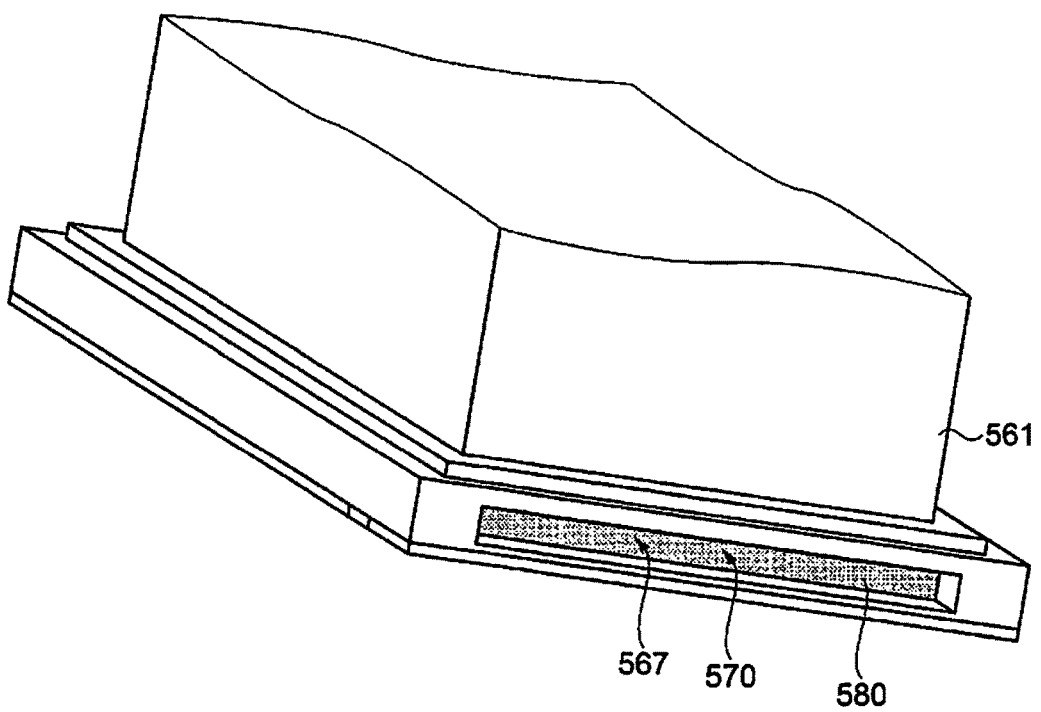
FIG. 27 is a sectional diagram illustrating the operation of the stopping portion.

FIGS. 25 and 26 are lateral sectional views illustrating the operation of the stopping portion and FIG. 27 is a perspective view illustrating the operation of the stopping portion.

As illustrated in FIG. 20, when the first shutter 565 is installed on the powder storage container 560 and the opening 562 is covered, the second shutter 581 is biased by the spring members 591 and abuts on the bottom surface of the first shutter 565. It is preferable that an abutting portion 582 of the second shutter 581 which abuts on the first shutter 565 be formed by the elastic member (for example, a rubber material or a film material). By using an elastic member for the abutting portion 582, it is possible to cause the abutting portion 582 to abut on the first shutter 565 without any gaps and it is possible to prevent the scattering of the powder. The position of the second shutter 581 at this time is the first position P11.

As illustrated in FIG. 25, the first shutter 565 is moved outward (in the removal direction) along the guide portions 568a, 568b, and 568c. At this time, the second shutter 581 holds the first position P11. In other words, the second shutter 581 is in a state in which the abutting portion 582 abuts on the bottom surface of the first shutter 565.

As illustrated in FIG. 26, when the first shutter 565 is further moved outward (in the removal direction), the second shutter 581 assumes a state in which the abutting portion 582 of the second shutter 581 separates from the first shutter 565, moves due to the biasing force of the spring members 591, and abuts on the guide portion 568c which is positioned thereabove. Here, when the first shutter 565 is removed from the powder storage container 560, since the guide portions 568c form a portion of the atmosphere communicating path 570, hereinafter, the bottom surfaces of the guide portions 568c will also be referred to as a top wall surface 570a of the atmosphere communicating path 570.

In other words, the abutting portion 582 of the second shutter 581 is biased by the spring members 591 and abuts on the top wall surface 570a of the atmosphere communicating path 570. The position of the second shutter 581 at this time is the second position P12. In this manner, due to the second shutter 581 moving (being displaced) from the first position P11 to the second position P12, the space which may become the atmosphere communicating path 570 when the first shutter 565 is removed from the powder storage container 560 is stopped by the second shutter 581.

Here, it is preferable that an end portion 581a (the end portion facing the abutting portion 582) on the rocking fulcrum side of the second shutter 581 have a curved shape. Accordingly, it is possible to smoothly move the second shutter 581 from the first position P11 to the second position P12. It is preferable for the end portion (the end portion on the side which abuts on the second shutter 581) on the installation direction side of the first shutter 565 to be a curved surface (an arc shape) or an inclined surface. More specifically, it is preferable that, when removing the first shutter 565, the abutting portion 582 of the second shutter 581 be formed to be capable of gradually moving from the abutting surface of the first shutter 565 to the abutting wall surface (the top wall surface 570*a*) of the atmosphere communicating path 570. Accordingly, it is possible to cause the abutting portion 582 (the leading end portion of the abutting portion 582) of the second shutter 581 to always abut on the abutting surface of the first shutter 565 or the abutting wall surface of the atmosphere communicating path 570 and it is possible to more reliably suppress the scattering of the powder.

When removing the first shutter 565 from the powder storage container 560, it is possible to scrape off the powder which is adhered to the abutting surface of the first shutter 565 using the abutting portion 582 of the second shutter 581.

Next, a description will be given of the configuration of the sheet manufacturing apparatus of the present embodiment. The sheet manufacturing apparatus of the present embodiment is an apparatus provided with a mixing unit which mixes, in the atmosphere, a binding resin powder and fibers which are supplied by a powder supply device, and a sheet forming unit which accumulates and heats the mixture which is mixed by the mixing unit to form a sheet.

A sheet manufacturing apparatus 100A according to the present embodiment differs from the sheet manufacturing apparatus 100 of the first embodiment in that the powder supply device 52A is provided instead of the powder supply device 52. Hereinafter, constituent members that are the same as those of the first embodiment are given the same reference numerals and the description thereof will be omitted or simplified, and a description will be given of the points which differ from the first embodiment.

Figure 28:
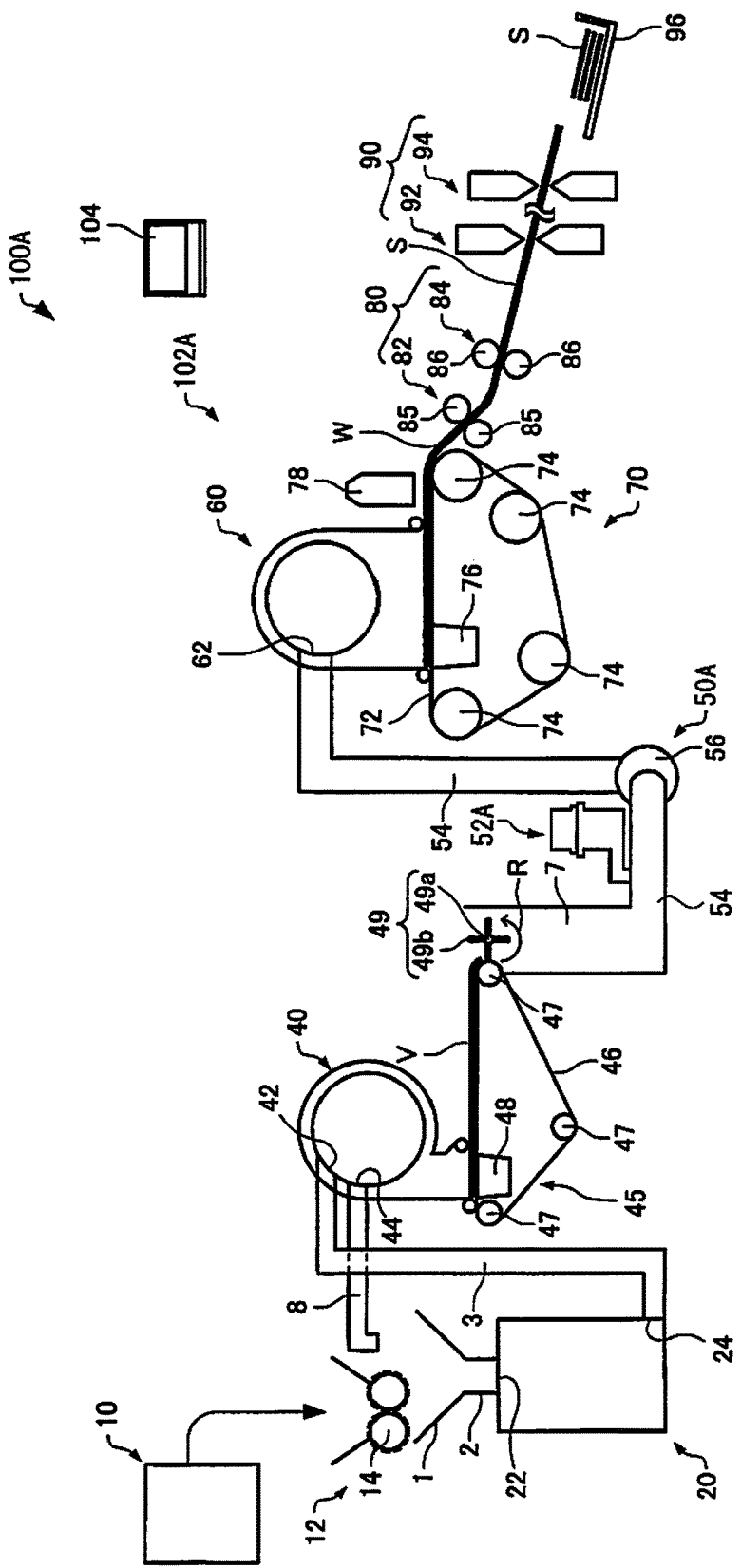
FIG. 28 is a schematic view illustrating the configuration of the sheet manufacturing apparatus.

FIG. 28 is a schematic view illustrating the configuration of the sheet manufacturing apparatus. As illustrated in FIG. 28, the sheet manufacturing apparatus 100A of the present embodiment is provided with the supply unit 10, a manufacturing unit 102A, and the control unit 104. The manufacturing unit 102A manufactures sheets. The manufacturing unit 102A includes the crushing unit 12, the defibrating unit 20, the sorting unit 40, the first web forming unit 45, the rotating body 49, a mixing unit 50A, the accumulating unit 60, the second web forming unit 70, the sheet forming unit 80, and the cutting unit 90.

The mixing unit 50A mixes the first sorted matter which passes through the sorting unit 40 (the first sorted matter which is transported by the first web forming unit 45) and a binding resin powder. The mixing unit 50A includes the powder supply device 52A which supplied the binding resin powder, the tube 54 which transports the first sorted matter and the binding resin powder, and the blower 56. The tube 54 continues from the tube 7.

In the mixing unit 50A, an airflow is generated by the blower 56 and, while mixing the first sorted matter and the binding resin powder, it is possible to transport the mixture in the tube 54. The mechanism which mixes the first sorted matter and the binding resin powder is not particularly limited.

The powder supply device 52A is provided with a storage chamber 530 and the powder storage container 560. Since the detailed configuration of the powder supply device 52A is the same as the above-described configuration, the description will be omitted (refer to FIGS. 18 to 27). The supply port 545*a* of the transport path 545 in the powder supply device 52A is connected (communicated) with the tube 54 and the binding resin powder of the storage chamber 530 is supplied to the inside of the tube 54 via the transport path 545.

The binding resin powder which is supplied from the powder supply device 52A includes a resin for binding a plurality of fibers. At the time at which the resin is supplied, the plurality of fibers is not bound. The resin melts when the resin passes through the sheet forming unit 80 and causes the plurality of fibers to bind.

The binding resin powder which is supplied from the powder supply device 52A is a thermoplastic resin or a heat curing resin, for example, the binding resin powder is AS resin, ABS resin, polypropylene, polyethylene, polyvinyl chloride, polystyrene, acrylic resin, polyester resin, polyethylene terephthalate, polyphenylene ether, polybutylene terephthalate, nylon, polyamide, polycarbonate, polyacetal, polyphenylene sulfide, polyether ether ketone, or the like. These resins may be used alone or in a mixture, as appropriate.

Depending on the type of sheet to be manufactured, in addition to the resin which binds the fibers, the binding resin powder which is supplied from the powder supply device 52A may include a colorant for coloring the fibers, a dispersing agent for preventing aggregation of the fibers, and a flame retardant for rendering the fibers and the like less susceptible to burning. The mixture (the mixture of the first sorted matter and the binding resin powder) which passes through the mixing unit 50A is transferred to the accumulating unit 60 via the tube 54.

According to the present embodiment described above, it is possible to obtain the following effects.

The atmosphere communicating path 570 which is formed when the first shutter 565 is removed from the powder storage container 560 is covered by the second shutter 581. Accordingly, it is possible to reliably prevent the scattering of the powder in the powder supply device 52A.

It is possible to prevent problems such as the adherence of dirt to the sheet manufacturing apparatus 100A and dirt to the sheet S caused by the scattering of the binding resin powder.

The present invention is not limited to the embodiments and it is possible to add various modifications and improvements to the embodiments. Hereinafter, various modification examples are given. The modification examples may be combined.

MODIFICATION EXAMPLE 1

The powder storage container 150 of the embodiments is disposed above the storage chamber 152 in the vertical direction but is not limited to this configuration. For example, the powder storage container 150 may be configured to be disposed diagonally above the storage chamber 152. Even if this configuration is adopted, it is possible to pour the powder which is stored in the powder storage container 150 into the storage chamber 152 using gravity.

MODIFICATION EXAMPLE 2

A configuration is adopted in which the first shutter 130 is moved along the first direction (the horizontal direction) to open and close the first shutter 130, but the movement direction is not limited. For example, a configuration may be adopted in which the first shutter 130 is moved diagonally upward or diagonally downward to open and close the first shutter 130. Even if this configuration is adopted, it is possible to obtain the same effects.

MODIFICATION EXAMPLE 3

A configuration is adopted in which the second shutter 112 is moved along the first direction (the horizontal direction) to remove the second shutter 112, but the removal (attachment and detachment) direction is not limited. For example, a configuration may be adopted in which the second shutter 112 is moved diagonally upward or diagonally downward to remove the second shutter 112. Even if this configuration is adopted, it is possible to obtain the same effects.

MODIFICATION EXAMPLE 4

Figure 16:
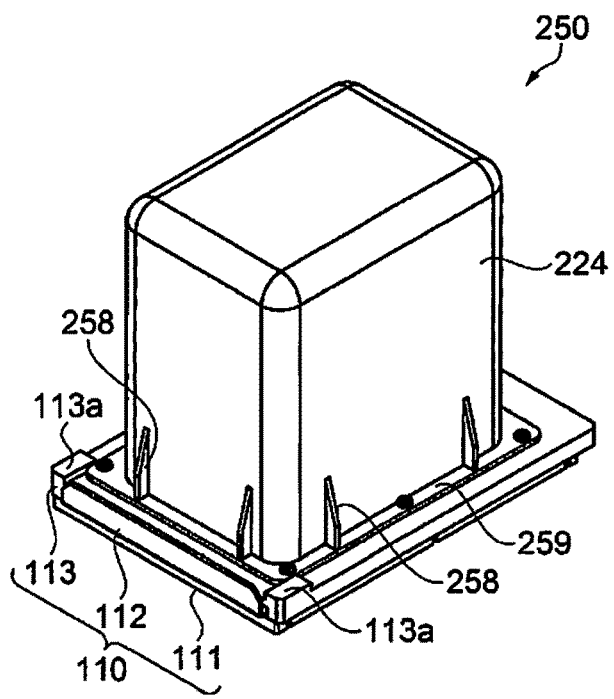
FIG. 16 is a front perspective view illustrating the external appearance of the powder storage container (the cartridge) according to the modification example.
Figure 17:
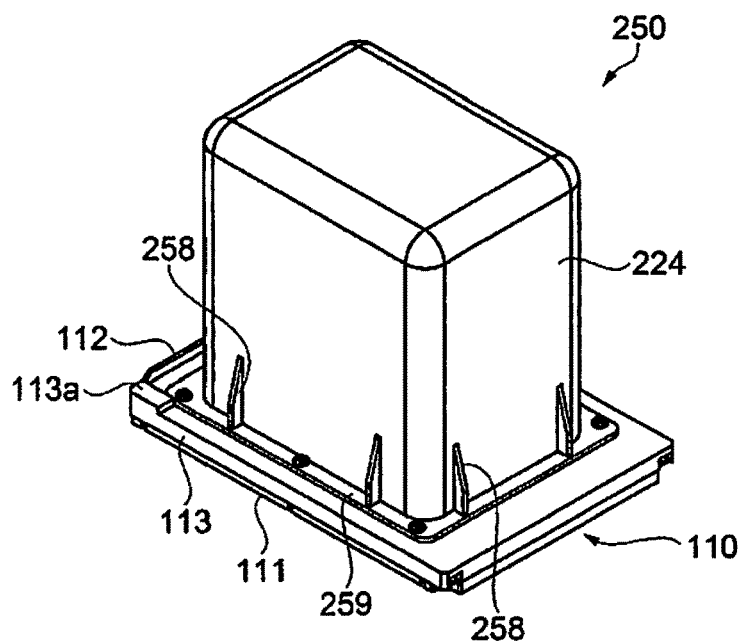
FIG. 17 is a rear perspective view illustrating the external appearance of the powder storage container (the cartridge) according to the modification example.

The configuration of the container portion 114 which configures the powder storage container 150 is not limited to the configuration that is described earlier, the stored powder may be supplied to the storage chamber (the hopper) 152 side by gravity, and the configuration thereof is arbitrary. For example, as a modification example of the container portion 114 which configures the powder storage container 150, it is possible to apply a configuration of a powder storage container 250 which is provided with a container portion 224 of a configuration similar to that illustrated in FIGS. 16 and 17. FIGS. 16 and 17 illustrate the external appearance of the powder storage container (the cartridge) according to the modification example, FIG. 16 is a front perspective view, and FIG. 17 is a rear perspective view.

In the powder storage container (the cartridge) 250 of the present modification example illustrated in FIGS. 16 and 17, the container portion 224 is connected to the top of the container connecting unit 110 instead of the container portion 114 of the first embodiment. The container portion 224 is connected to the container connecting unit 110 at a container flange 259 which includes ribs 258 which stick out in four directions on the opening side of the container portion 224. In the same manner as the embodiments, the container connecting unit 110 is configured to include the first holder flange 111, the second shutter 112 which serves as a shutter of the container, the second holder flange 113, and the flange convex portion 113a which serves as a convex portion. The container portion 224 of the present modification example is formed such that the sectional area of the container portion 224 in the horizontal direction is substantially the same upward in the vertical direction. In comparison with the container portion 114 which configures the powder storage container 150 of the embodiments, the powder storage container 250 of the present modification example is configured such that the height (the length) of the container portion 224 is shortened and the storage volume of the powder is reduced. In the powder storage container 250 of the present configuration, it is possible to favorably use with respect to a powder with a comparatively small necessary storage amount. In the present modification example, although an example is given in which the sectional shape is quadrilateral, the sectional shape is not limited to being quadrilateral, and, for example, may be another shape such as circular, elliptical, or polygonal.

MODIFICATION EXAMPLE 5

The stopping portion 580 of the embodiment is provided on the powder storage container 560 (the first collar portion 569), but the configuration is not limited thereto. For example, the stopping portion 580 may be provided on the storage chamber 530 (the second collar portion 550) side. Even if this configuration is adopted, it is possible to obtain the same effects.

MODIFICATION EXAMPLE 6

In the embodiment, in lateral sectional view, the second shutter 581 is disposed under (on the bottom surface side of) the first shutter 565, but the configuration is not limited thereto. For example, a configuration may be adopted in which the second shutter 581 is disposed above (on the top surface side of) the first shutter 565 and the second shutter 581 is biased (biased downward) with respect to the top surface of the first shutter 565. Even if this configuration is adopted, it is possible to obtain the same effects.

MODIFICATION EXAMPLE 7

The second shutter 581 of the embodiment stops the atmosphere communicating path 570 between the attachment and detachment port 567 and the opening 562, but the configuration is not limited thereto. For example, a configuration may be adopted in which the attachment and detachment port 567 directly covers the second shutter 581. Even if this configuration is adopted, it is possible to obtain the same effects.

MODIFICATION EXAMPLE 8

The powder storage container 560 of the embodiment is disposed above the storage chamber 530 in the vertical direction but is not limited to this configuration. For example, the powder storage container 560 may be configured to be disposed diagonally above the storage chamber 530. Even if this configuration is adopted, it is possible to pour the powder which is stored in the powder storage container 560 into the storage chamber 530 using gravity.

MODIFICATION EXAMPLE 9

In the embodiment, a configuration is adopted in which the first shutter 565 is moved in the horizontal direction to remove the first shutter 565, but the removal (attachment and detachment) direction is not limited. For example, a configuration may be adopted in which the first shutter 565 is moved diagonally upward to remove the first shutter 565. Even if this configuration is adopted, it is possible to obtain the same effects.

REFERENCE SIGNS LIST

10 . . . supply unit, 12 . . . crushing unit, 20 . . . defibrating unit, 40 . . . sorting unit, 45 . . . first web forming unit, 49 . . . rotating body, 50 . . . mixing unit, 52 . . . powder supply unit, 60 . . . accumulating unit, 70 . . . second web forming unit, 80 . . . sheet forming unit, 90 . . . cutting unit, 100 . . . sheet manufacturing apparatus, 102 . . . manufacturing unit, 104 . . . control unit, 110 . . . container connecting unit, 111 . . . first holder flange, 112 . . . second shutter serving as shutter of container, 113 . . . second holder flange, 113a . . . flange convex portion serving as convex portion; 114, 224 . . . container portion, 114a . . . part with small sectional area, 114b . . . part with large sectional area, 114c . . . connecting part, 115a, 115b . . . opening, 116a, 116b . . . flat spring serving as elastic portion, 117, 118 . . .

cutout wall portion, 117*a*, 118*a* . . . cutout wall portion, 119 . . . end pressure portion, 119*a* . . . guide surface, 119*b* . . . protrusion portion, 120 . . . mounting portion, 120*b* . . . bottom surface of mounting portion, 121 . . . support portion, 121*b* . . . bottom surface of support portion, 122 . . . mounting guide portion, 123 . . . spring convex portion, 124 . . . shutter recessed portion, 125 . . . opening, 126 . . . seal member, 127 . . . through hole serving as second engaging portion, 128 . . . end wall portion serving as abutting portion, 130 . . . first shutter, 131 . . . first plate portion serving as shutter member, 131*a* . . . first receiving groove, 132 . . . second plate portion serving as shutter member, 132*a* . . . second receiving groove, 133 . . . third plate portion serving as shutter member, 133*a* . . . third receiving groove, 134 . . . fourth plate portion serving as shutter member, 134*a* . . . fourth receiving groove, 135 . . . first guide pin, 136 . . . second guide pin, 140 . . . slider unit, 142 . . . lever portion (gripping portion), 142*a* . . . lever support portion, 143, 144 . . . sliding plate, 143*a* . . . top end surface of sliding plate, 145 . . . cam groove, 146 . . . first sliding guide portion, 147 . . . second sliding guide portion, 148 . . . stepped pin serving as first engaging portion, 148*a* . . . narrow diameter portion, 148*b* . . . large diameter portion, 148*c* step portion, 149 . . . escape recessed portion, 150, 250 . . . powder storage container (cartridge) serving as container, 151 . . . fixing unit, 151*a* . . . top surface of fixing unit, 152 . . . storage chamber (hopper), 153 . . . inlet, 155 . . . fixing guide portion, 156*a*, 156*b* . . . flat spring escape groove, 157 . . . front portion guide, 158 . . . rib, 159 . . . container flange, 160 . . . movement region, 161 . . . long groove hole, 162 . . . top portion guide, 200 . . . installation unit.

The invention claimed is:

1. A sheet manufacturing apparatus which manufactures sheets including a powder and fibers, comprising:
an installation unit on which a container that stores the powder is installed,
wherein the installation unit includes
an inlet for receiving the powder from the container, and
a first shutter for opening and closing the inlet,
wherein the first shutter is capable of moving between an open position at which the inlet is opened and a closed position at which the inlet is closed in accordance with attachment and detachment of the container with respect to the installation unit, and
wherein the first shutter is provided with a plurality of shutter members and, at the open position, the plurality of shutter members are stored overlapping one another.

2. The sheet manufacturing apparatus according to claim 1,
wherein the container and the installation unit are capable of relative movement along a first direction, and
wherein a shutter movement mechanism for moving the first shutter to open and close the inlet when the container moves along the first direction with respect to the installation unit is provided.

3. The sheet manufacturing apparatus according to claim 2,
wherein the shutter movement mechanism includes a first engaging portion which is provided on the first shutter, and
wherein the first engaging portion and a second engaging portion which is provided on the container engage and the first shutter moves along the first direction and opens and closes the inlet in accordance with movement of the container along the first direction.

4. The sheet manufacturing apparatus according to claim 2,
wherein the installation unit includes
a mounting portion on which the container is mounted and which includes a support portion which supports the container such that the container is capable of moving along the first direction between an installation start position and an intermediate position, and
a slider unit which includes a cam groove for moving the mounting portion in a second direction which intersects the first direction to move the container between the intermediate position and an installation completion position.

5. The sheet manufacturing apparatus according to claim 4,
wherein the slider unit further includes a lever portion for manipulating the slider unit,
wherein when the container is at the installation start position, the lever portion is positioned below the container, and
wherein when the container is at the intermediate position, the lever portion is provided to be positioned closer to a front side in an installation direction than the container.

6. The sheet manufacturing apparatus according to claim 5,
wherein the lever portion includes a lever support portion which supports the container which is present at the installation start position.

7. The sheet manufacturing apparatus according to claim 4,
wherein the container includes
an opening for supplying the powder which is stored,
a second shutter for opening and closing the opening, and
a locking mechanism for locking the second shutter at the closed position at which the second shutter covers the opening, and
wherein the installation unit includes an unlocking mechanism for unlocking the second shutter when the container is installed and is at the installation completion position.

8. The sheet manufacturing apparatus according to claim 7,
wherein the locking mechanism includes an elastic portion for engaging with the second shutter to lock the second shutter at the closed position, and
wherein the unlocking mechanism deforms the elastic portion to unlock the second shutter when the container moves from the intermediate position to the installation completion position.

9. The sheet manufacturing apparatus according to claim 1,
wherein the mounting portion includes an abutting portion which abuts on a convex portion which is provided on one side of the container along the installation direction and prevents movement of the container before the container reaches the intermediate position from the installation start position.

* * * * *